(12) United States Patent
Ito et al.

(10) Patent No.: US 9,335,160 B2
(45) Date of Patent: May 10, 2016

(54) PROFILE MEASURING APPARATUS

(75) Inventors: Yuka Ito, Hiratsuka (JP); Haruhiko Fujisawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 113 days.

(21) Appl. No.: 13/064,922

(22) Filed: Apr. 26, 2011

(65) Prior Publication Data

US 2011/0270562 A1  Nov. 3, 2011

(30) Foreign Application Priority Data

Apr. 26, 2010  (JP) ................. P2010-101286
Apr. 26, 2010  (JP) ................. P2010-101288
Apr. 26, 2010  (JP) ................. P2010-101289

(51) Int. Cl.
*G01B 11/25*  (2006.01)
*G01B 9/02*  (2006.01)
*G01B 21/20*  (2006.01)

(52) U.S. Cl.
CPC ............ *G01B 11/25* (2013.01); *G01B 9/02055* (2013.01); *G01B 11/2518* (2013.01); *G01B 21/20* (2013.01)

(58) Field of Classification Search
CPC .............. G01B 11/25; G01B 11/2518; G01B 9/02055; G01B 9/0207; G01B 21/20; G06T 7/0057
See application file for complete search history.

(56) References Cited

U.S. PATENT DOCUMENTS

| 4,993,835 | A | 2/1991 | Inoue et al. |
| 5,579,246 | A | 11/1996 | Ebersbach et al. |
| 5,850,289 | A * | 12/1998 | Fowler et al. ............... 356/603 |
| 6,868,356 | B2 * | 3/2005 | Nai et al. ................. 702/95 |
| 7,490,019 | B2 | 2/2009 | Fukumoto et al. |
| 8,081,223 | B2 | 12/2011 | Okada |
| 2005/0028393 | A1 | 2/2005 | Raab et al. |
| 2005/0222801 | A1 * | 10/2005 | Wulff et al. ............... 702/141 |
| 2005/0248774 | A1 * | 11/2005 | Herrmann et al. ........... 356/601 |

(Continued)

FOREIGN PATENT DOCUMENTS

| CN | 1630804 | 6/2005 |
| JP | 2000-039321 | 2/2000 |

(Continued)

OTHER PUBLICATIONS

Chen et al. Overview of three-dimensional shape measurement using optical methods, Opt. Eng. 39(1) 10-20 (Jan. 2000.*

(Continued)

*Primary Examiner* — Alexander Satanovsky
*Assistant Examiner* — John Kuan

(57) ABSTRACT

According to one embodiment, a profile measuring apparatus comprises a profile measuring unit, a position acquiring unit, a profile calculating unit, a deflection detecting unit, and a controlling unit. The profile measuring unit has a projecting unit to project a pattern onto a measured object, and an imaging unit to image the pattern. The position acquiring unit acquires a position of the profile measuring unit. The profile calculating unit calculates a profile of the measured object, based on image information from the imaging unit and position information from the position acquiring unit. The deflection detecting unit detects deflection of the projecting unit. The controlling unit executes active correction for the profile measuring unit and/or passive correction for the profile calculating unit, based on the deflection of the projecting unit detected by the deflection detecting unit.

15 Claims, 17 Drawing Sheets

(56) References Cited

U.S. PATENT DOCUMENTS

| | | |
|---|---|---|
| 2007/0097381 A1* | 5/2007 | Tobiason et al. ............ 356/604 |
| 2007/0150228 A1 | 6/2007 | Fukumoto et al. |
| 2008/0024753 A1* | 1/2008 | Gladnick et al. ............ 356/3.01 |
| 2008/0188983 A1* | 8/2008 | Ban et al. ............ 700/245 |

FOREIGN PATENT DOCUMENTS

| | | |
|---|---|---|
| JP | 2003-344045 | 12/2003 |
| JP | 2005-114845 | 4/2005 |
| JP | 2007-171077 | 7/2007 |
| JP | 2008190962 A * | 8/2008 |
| JP | 2009-044856 | 2/2009 |
| JP | 2009-105784 | 5/2009 |
| WO | WO 03/069267 | 8/2003 |

OTHER PUBLICATIONS

International Search Report mailed Aug. 19, 2011 in corresponding International Patent Application PCT/JP2011/060617.
Japanese Notice of Reasons for Rejection dated Oct. 11, 2013 in Japanese Patent Application No. 2010-101286.
Chinese Office Action dated Jun. 18, 2014 for Chinese Patent Application No. 201180020970.2.
Chinese Office Action mailed Apr. 15, 2015 in related Chinese Application No. 201180020970.2.

* cited by examiner

PROFILE MEASURING APPARATUS

CROSS REFERENCE TO RELATED APPLICATIONS

This application claims priority from Japanese Patent Application No. 2010-101289 filed on Apr. 26, 2010, Japanese Patent Application No. 2010-101288 filed on Apr. 26, 2010 and Japanese Patent Applications No. 2010-101286 filed on Apr. 26, 2010 in the Japanese Intellectual Property Office, the entire disclosures of which are incorporated herein by reference.

BACKGROUND

1. Field

One embodiment of the invention relates to a profile measuring apparatus for measuring a three-dimensional (3D) profile of an object to be measured (measured object).

2. Description of the Related Art

A method using a laser range finder is known as a conventional method for measuring a 3D profile of a measured object (e.g., cf. U.S. Pat. No. 4,993,835). This method is to apply a laser beam onto a surface of the measured object, to observe the measured object from a direction different from a direction of application of the laser beam, and to obtain the 3D profile of the measured object irradiated with the laser beam, by the principle of triangulation. In this method, the laser beam scans on the measured object whereby the 3D profile of the entire measured object can be obtained.

SUMMARY

According to an embodiment of the invention, a profile measuring apparatus comprising: a profile measuring unit which has a projecting unit to project a predetermined pattern onto a measured object, and an imaging unit to image the pattern projected by the projecting unit; a position acquiring unit which acquires a position of the profile measuring unit; a profile calculating unit which is connected so as to be able to communicate with the imaging unit and the position acquiring unit and which calculates a profile of the measured object, based on image information from the imaging unit and position information from the position acquiring unit; a deflection detecting unit which detects deflection of the projecting unit; and a controlling unit which is connected to the deflection detecting unit and which executes at least either of active correction for position control or operation control of the profile measuring unit and passive correction for calculation operation of the profile calculating unit, based on the deflection of the projecting unit detected by the deflection detecting unit.

For purposes of summarizing the invention, certain aspects, advantages, and novel features of the invention have been described herein. It is to be understood that not neccesarily all such advantages may be achieved in accordance with any particular embodiment of the invention. Thus, the invention may be embodied or carried out in a manner that achieves or optimizes one advantage or group of advantages as taught herein without neccesarily achieving other advantages as may be taught or suggested herein.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings.

First Embodiment

Figure 1:
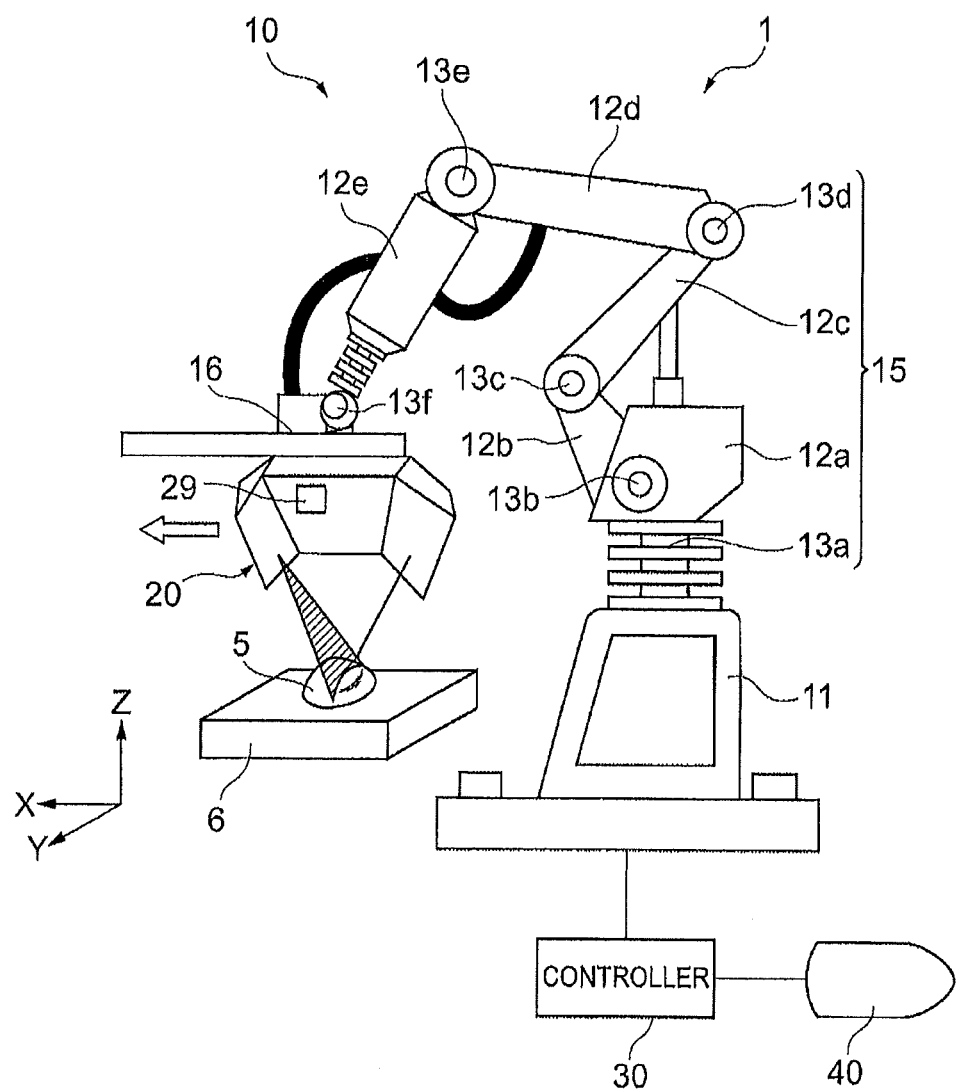
FIG. 1 is an exemplary overall diagram of a profile measuring apparatus.

FIG. 1 shows an exemplary profile measuring apparatus of the first embodiment and this profile measuring apparatus 1 is constructed with a stage 6 supporting an object to be measured (measured object) 5, a profile measuring unit 10 which measures a profile of the measured object 5 mounted on the stage 6, a controlling unit 30 which calculates profile information about the measured object 5 on the basis of information output from the profile measuring unit 10 and which controls the operation of calculation of the profile information or motion of moving mechanism unit 15, based on a signal from below-described deflection detecting unit 28, and a display unit 40 which outputs, for example, a 3D image of the profile information calculated by the controlling unit 30. Even if the measured object 5 is not mounted on the stage 6, the profile measuring apparatus 1 can measure the profile of the measured object 5 as long as the measured object 5 is located within an operating range of the profile measuring unit 10.

The profile measuring unit 10 is constructed with a base 11, the moving mechanism unit 15 of a multijoint structure which has a plurality of arms 12a-12e and joints (connections) 13a-13f and a base end of which is attached to the base 11, and a probe 20 which is detachably attached through an attaching part 16 to a distal end of the moving mechanism unit 15 (a distal end of leading arm 12e). The moving mechanism unit 15 has, in order from the base end side, the base arm 12a, the first intermediate arm 12b, the second intermediate arm 12c, the third intermediate arm 12d, and the leading arm 12e and the first to sixth joints 13a-13f are provided at ends of the respective arms 12a-12e. It further includes the attaching part 16 slidably holding the probe 20.

The first joint 13a joins the base end of the base arm 12a and the base 11, whereby the base arm 12a is configured so as to be rotatable about a rotation axis on an axis extending in a nearly normal direction to the base 11. The second joint 13b joins the distal end of the base arm 12a and the base end of the first intermediate arm 12b, whereby one of the base arm 12a and the first intermediate arm 12b is configured so as to be swingable (or rotatable) with respect to the other. The third joint 13c joins the distal end of the first intermediate arm 12b and the base end of the second intermediate arm 12c, whereby one of the first intermediate arm 12b and the second intermediate arm 12c is configured so as to be swingable (or rotatable) with respect to the other.

The fourth joint 13d joins the distal end of the second intermediate arm 12c and the base end of the third intermediate arm 12d, whereby one of the second intermediate arm 12c and the third intermediate arm 12d is configured so as to be swingable (or rotatable) with respect to the other. The fifth joint 13e joins the distal end of the third intermediate arm 12d and the base end of the leading arm 12e, whereby one of the third intermediate arm 12d and the leading arm 12e is configured so as to be swingable (or rotatable) with respect to the other. The sixth joint 13f joins the distal end of the leading arm 12e and the attaching part 16 for the probe 20, whereby the probe 20 attached to the attaching part 16 is configured so as to be swingable (or rotatable) with respect to the leading arm 12e and rotatable about a rotation axis on an axis extending in parallel to the leading arm 12e. The second to fifth joints 13b-13e have their respective rotation axes extending in approximately horizontal directions parallel to each other so that the intermediate arms and leading arm 12b-12e can swing in an identical plane (or in a nearly vertical plane).

Figure 2:
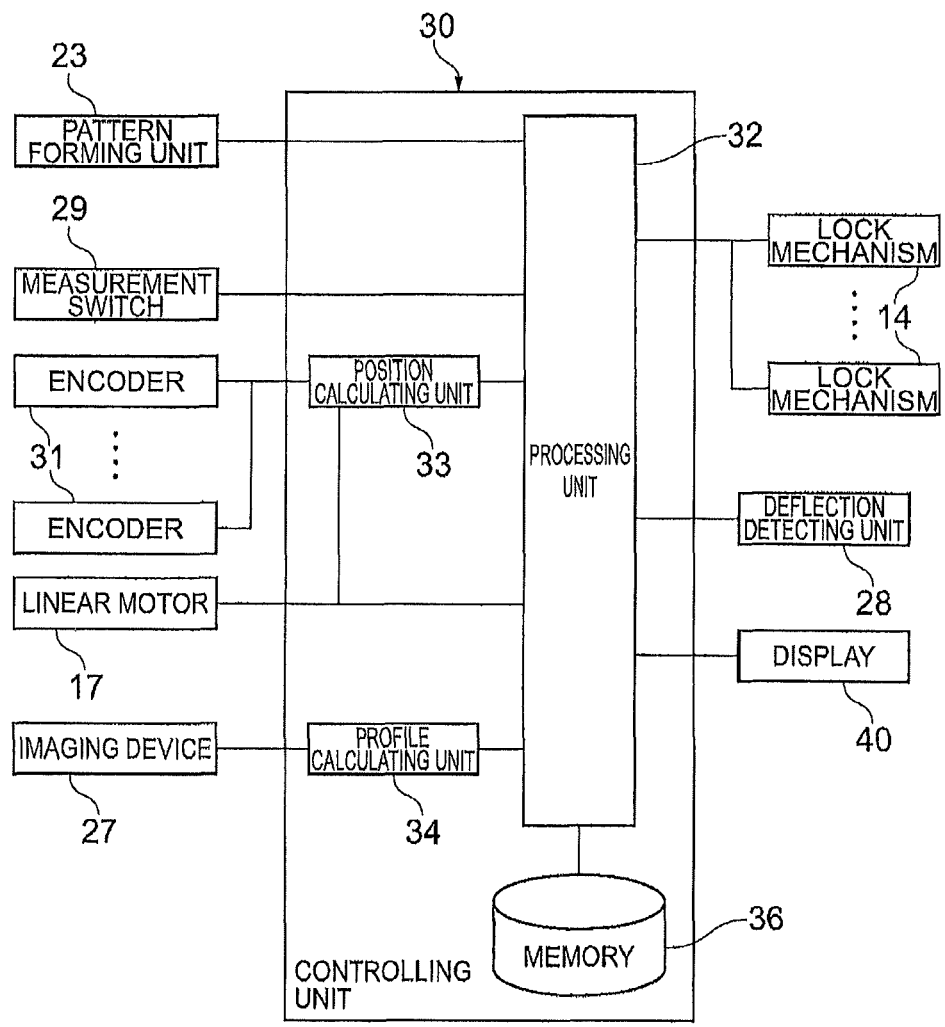
FIG. 2 is an exemplary control block diagram of the profile measuring apparatus.

At each of the rotation axes of the first to sixth joints 13a-13f, an encoder 31 to measure a rotation amount of the rotation axis of each joint 13a-13f is attached in order to detect an angle between the arm or the base 11 located on the base end side of each joint 13a-13f and the arm or the probe 20 located on the distal end side of each joint 13a-13f. Measurements by these encoders 31 (which will be referred to hereinafter as "angle information") are fed from each encoder 31 to the controlling unit 30, as shown in FIG. 2. Each of the first to sixth joints 13a-13f is provided with a lock mechanism 14 which swings (or rotates) the arm or the probe 20 located on the distal end side with respect to the arm or the base 11 located on the base end side of each joint 13a-13f and which secures (or locks) it at a predetermined position. The operations of these lock mechanisms 14 are controlled by the controlling unit 30.

The attaching part 16 holds the probe 20 so as to be slidable in a direction nearly normal to spreading directions of an illumination beam (below-described line beam) by linear motor 17 (cf. FIG. 2). Namely, the apparatus is configured so that the sliding direction of the probe 20 attached to and held on the attaching part 16 is a scan direction. The operation of the linear motor 17 mounted on the attaching part 16 is controlled by the controlling unit 30. An encoder (not shown) is incorporated in the linear motor 17 and measurements by this encoder are fed as displacement information of the probe 20 according to the operation of the linear motor 17 from the linear motor 17 (encoder) to the controlling unit 30. In the present embodiment, the sliding direction (scan direction) of the probe 20 will be sometimes referred to as an X-direction, a direction perpendicular to the optical-axis direction of the probe 20 (illuminating unit 21 as a projecting unit for projecting a predetermined pattern onto the measured object 5) and the X-direction as a Y-direction, and a direction perpendicular to the X-direction and the Y-direction as a Z-direction (cf. FIG. 1).

Figure 3:
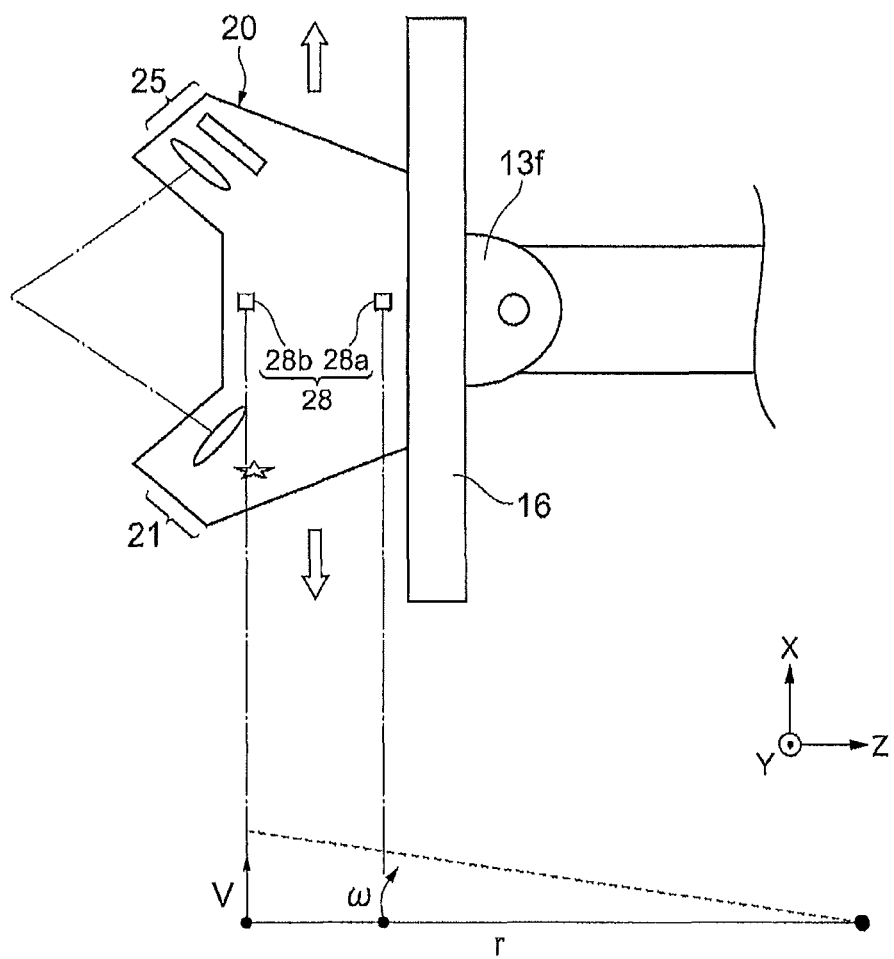
FIG. 3 is an exemplary enlarged view of an attaching part and a probe in the first embodiment.

The probe 20 is constructed, as shown in FIG. 3, with an illuminating unit 21 which illuminates the measured object 5, an imaging unit 25 which images the measured object 5 illuminated by the illuminating unit 21, and a deflection detecting unit 28 which detects deflection of the probe 20 (i.e., the illuminating unit 21 and imaging unit 25) due to influence of vibration from the outside. The illuminating unit 21 functions as a projecting unit which projects a predetermined pattern onto the measured object 5. The illuminating unit 21 and imaging unit 25 are held by a common housing so that their relative positions are always constant. The deflection detecting unit 28 is configured so as to be able to detect the deflection in the X-direction, the Y-direction, and Z-direction. Furthermore, as shown in FIG. 1, a measurement switch 29, which allows an operator to perform operations for instructing the controlling unit 30 to start and stop the profile measurement for the measured object 5, is provided on the side of the probe 20.

Figure 4:
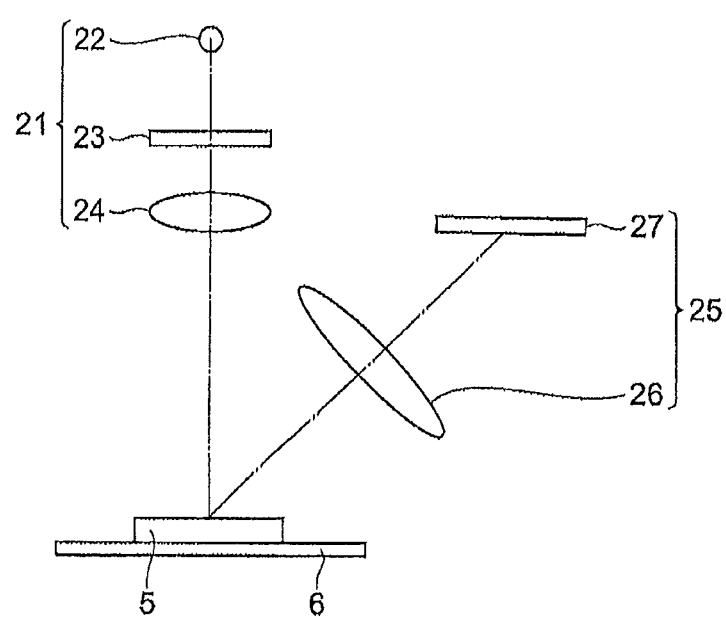
FIG. 4 is an exemplary schematic view of an illuminating unit and an imaging unit.

The illuminating unit 21 (projecting unit) is constructed, as shown in FIG. 4, with a light source 22 such as an LED, a pattern forming unit 23 which forms an illumination pattern, and a projection lens 24 which projects the illumination pattern formed on the pattern forming unit 23, onto the measured object 5. The pattern forming unit 23 is composed of a liquid crystal display device or the like and in the present embodiment, it forms the illumination pattern so as to obtain an illumination beam with a line-shaped cross section (which will be referred to hereinafter as a line beam). For this reason, the light emitted from the light source 22 travels through the pattern forming unit 23 to become the line beam and this line beam is applied (or projected) onto the measured object 5 on the stage 6 by the projection lens 24.

The imaging unit 25 is constructed, as shown in FIG. 4, with an imaging optical system 26 which forms an image of the line beam applied onto the measured object 5 (which will be referred to hereinafter as a line image), and an imaging device 27 which takes the line image formed by the imaging optical system 26. The imaging device 27 performs photoelectric conversion of the line image formed on the focal plane, to generate an image signal, and outputs the image information to a profile calculating unit 34. The image plane of the imaging optical system 26 satisfies the so-called Scheimpflug principle that the image plane is conjugate with a plane including the irradiation direction of the line beam applied. For this reason, the line image can be always formed as a sharp image, independent of the height of the measured object 5.

The deflection detecting unit 28, as shown in FIG. 3, has an angular velocity sensor 28a which detects an angular velocity of the probe 20 (illuminating unit 21 and imaging unit 25), and an acceleration sensor 28b which detects an acceleration of the probe 20, and detects the deflection of the probe 20 on the basis of the angular velocity and the acceleration detected by the angular velocity sensor 28a and the acceleration sensor 28b, respectively. The deflection of the probe 20 (illuminating unit 21 and imaging unit 25) herein is deviation (positional deviation and directional deviation) of the actual position (including direction) of the probe 20 (illuminating unit 21 and imaging unit 25) relative to a target position (including a direction) with slide movement (scan) of the probe 20 at a constant velocity (or a constant angular velocity).

Since it is sufficient that this deflection detecting unit 28 can detect deviation in the projected position (applied position) of the line image from the probe 20 or deviation in an imaging region of the imaging unit 25, mounting positions of the acceleration sensor 28b and angular velocity sensor 28a do not always have to be limited to those in this example. If the projected position of the line image on the measured object is linked to motion due to vibration occurring at the arms, the angular velocity sensor 28a and acceleration sensor 28b may be mounted near the attaching part 16 on the arms.

The profile measuring apparatus 1 of the present embodiment is a profile measuring apparatus that can be installed at a factory line or the like and there are cases where the profile measuring apparatus 1 is not installed on a vibration-proof table (not shown) or the like. In such cases, even if the joints 13a-13f are fixed with actuation of the lock mechanisms 14, the probe 20 will deflect relative to the measured object 5 because of influence of vibration from the outside, so as to cause positional deviation (deflection) of the probe 20 (illuminating unit 21 and imaging unit 25) relative to the target position with slide movement (scan) of the probe 20. Similar positional deviation (deflection) will also occur because of bending of each arm 12a-12e or the like.

The deflection detecting unit 28 is a unit that detects such deflection of the probe 20 (illuminating unit 21 and imaging unit 25). The angular velocity sensor 28a of the deflection detecting unit 28 detects angular velocities of the probe 20 around rotation axes on axes extending in the X-direction, the Y-direction and the Z-direction (which will be referred to hereinafter as X-rotation axis, Y-rotation axis and Z-rotation axis). The acceleration sensor 28b detects accelerations in the X-direction, the Y-direction and the Z-direction of the probe 20. The deflection of the probe 20 includes deflection due to rotation of the probe 20 and deflection due to translation of the probe 20. However, since the probe 20 of the present embodiment is attached to the distal end of the moving mechanism unit 15 (the distal end of the leading arm 12e) having the plurality of arms 12a-12e, the deflection due to translation of the probe 20 is considered to be considerably smaller than the deflection due to rotation (swing) of the probe 20, and therefore the deflection of the probe 20 can be approximated to only the deflection due to rotation of the probe 20. However, since the moving mechanism unit 15 has many joints, it may act as a parallel link mechanism. Namely, there are cases where no angular velocity is detected while an acceleration is detected because of deflection. In such cases, the deflection is processed as deflection due to translation (parallel deflection). The deflection due to translation (parallel deflection) can also be processed in the same manner as the deflection due to rotation (swing) if the center of rotation is considered to be located sufficiently far.

Therefore, as shown in FIG. 3, there is the relation of $V=r\times\omega$, where V is the rotational velocity (vector) occurring at the probe 20 due to deflection, $\omega$ the angular velocity occurring at the probe 20 due to deflection, and r the radius gyration (vector) of deflection of the probe 20; therefore, the deflection detecting unit 28 can determine the radius gyration r (and the center of rotation) of deflection of the probe 20, using the angular velocity $\omega$ and acceleration dV/dt detected by the angular velocity sensor 28a and the acceleration sensor 28b, respectively. At this time, the rotational velocity V due to deflection can be obtained by integration of the acceleration dV/dt detected by the acceleration sensor 28b and the radius of gyration r can be determined from the relational expression of $r=V/(\omega+C)$. Here, C is a constant or a function set so as to avoid divergence of the radius of gyration r. Furthermore, since an angle of rotation $\phi$ of the probe 20 can be obtained by integration of the angular velocity $\omega$ detected by the angular velocity sensor 28a, the deflection detecting unit 28 can determine a deflection amount ($=r\times\phi$) of the probe 20, using the radius of gyration r and the angle of rotation $\phi$ of the probe 20 thus obtained. In the case of executing deflection detection by the scan of the probe 20, since angle velocity and acceleration can be calculated based on an output value from an encoder provided on each joint, the angle velocity and acceleration due to deflection can be calculated by correcting the angle velocity and acceleration occurred by the scan based on the angle velocity and acceleration detected by the deflection detecting unit 28.

Since the deflection of the probe 20 is substantially identical to displacement of the probe 20 and since the probe 20 moves in the X-direction during the scan, an X-directional deflection amount of the probe 20 is determined by subtracting influence due to the scan of the probe 20 from the deflection amount obtained using the angular velocity around the rotation axis of the Y-rotation axis and the X-directional acceleration of the probe 20. The influence due to the scan includes a component detected by the angular velocity sensor, as a rotational component from the translation due to the scan. This component can be preliminarily determined by executing a scan operation in an environment without vibration. The scan direction of the probe 20 is the X-direction and there must be no movement in the Y-direction due to the scan during the scanning operation; therefore, a deflection amount obtained using the angular velocity around the rotation axis of the X-rotation axis and the Y-directional acceleration of the probe 20 is defined as a Y-directional deflection amount of the probe 20 as it is.

The controlling unit 30 is constructed, as shown in FIG. 2, with a processing unit 32 which controls the processing of profile measurement of the measured object 5 achieved by the profile measuring apparatus 1, a position calculating unit 33 which calculates space coordinates and posture (which are coordinates and posture with an origin at a predetermined point in a measurement space and which will be referred to hereinafter as "position information") of the probe 20, using the angle information output from the respective encoders 31 and the displacement information (scan amount) output from the linear motor 17, and the profile calculating unit 34 which calculates the profile information (3D profile) of the measured object 5, using the position information output from the position calculating unit 33 and the image information of the line image (the image of the line beam projected onto the measured object 5) output from the imaging device 27. The measurement space herein refers to a scope (space) in which the profile measuring apparatus 1 can acquire the space coordinates of the measured object 5 with movement of the probe 20. The position calculating unit 33 constitutes at least a part of a position acquiring unit and this position acquiring unit acquires the position of the profile measuring unit 10 including the probe 20, to acquire the position on the measured object 5 where the line beam is projected on.

The controlling unit 30 is realized, for example, by a computer and the processing unit 32, position calculating unit 33, and profile calculating unit 34 are implemented as programs executed by this computer. An output (operation signal) from the measurement switch 29 is fed into the processing unit 32 and the processing unit 32 controls the action of the pattern forming unit 23 and others according to an output from the measurement switch 29. The profile information output from the profile calculating unit 34 is stored, for example, in a memory 36 provided in the controlling unit 30 and this profile information is further processed by the processing unit 32 to be output as a 3D image on the display unit 40.

Since the information about the lengths of the respective arms 12a-12e and others is known, the position calculating unit 33 (included in the position acquiring unit) of the controlling unit 30 calculates the angle between the arm or the base 11 located on the base end side of each joint 13a-13f and the arm or the probe 20 located on the distal end side of each joint 13a-13f, based on the angle information output from the respective encoders 31, and, by additionally using the displacement information (scan amount) output from the linear motor 17 (encoder), it can obtain the 3D coordinates (space coordinates) on the space of the probe 20 and the projection direction of line beam projected from the probe 20. Furthermore, since the relative positional relation (relative coordinates) of the illuminating unit 21 and the imaging unit 25 in the probe 20 is also known, the position calculating unit 33 can also calculate which part of the measured object is under measurement. Then the profile calculating unit 34 can determine the 3D profile of the measured object 5 within the range of imaging by the imaging unit 25 (the 3D profile of the measured object 5 under projection of the line beam (e.g., which is expressed as a group of coordinates in the measurement space represented as discrete coordinates in this range)), by determining the photographed position of the line image from the image information (image position information of the line image) acquired by the imaging unit 25 (imaging device 27), on the basis of the principle of triangulation.

The deflection of the probe 20 (illuminating unit 21 and imaging unit 25) can occur as described above. Therefore, in this first embodiment the controlling unit 30 executes passive correction for the calculation operation of the profile calculating unit 34.

Namely, when the profile calculating unit 34 calculates the profile information of the measured object 5, correction is made for the measurement position information of the measured object (the position information acquired by the position acquiring unit) upon acquisition of the picture of the line image, based on the deflection of the probe 20 (illuminating unit 21 and imaging unit 25) detected by the deflection detecting unit 28. At this time, for example, the controlling unit performs the correction to carry out such an operation to cancel the deflection amount in the X-direction (or the Y-direction) of the probe 20, for the X-directional (or Y-directional) coordinate values of the line image on the picture. Specifically, it obtains measurement positions on the measured object, calculated based on the angle information output from the respective encoders, and change amount of the measurement position due to deflection. On the other hand, it obtains the positions of the line image on the picture. Then the measurement positions are corrected by the previously determined change amount relative to the calculated measurement positions on the measured object, whereby the deviation of the measurement positions on the measured object due to the deflection can be corrected. In this manner, it becomes feasible to reduce the measurement error of the 3D profile, even with vibration added to the profile measuring apparatus 1.

Figure 5:
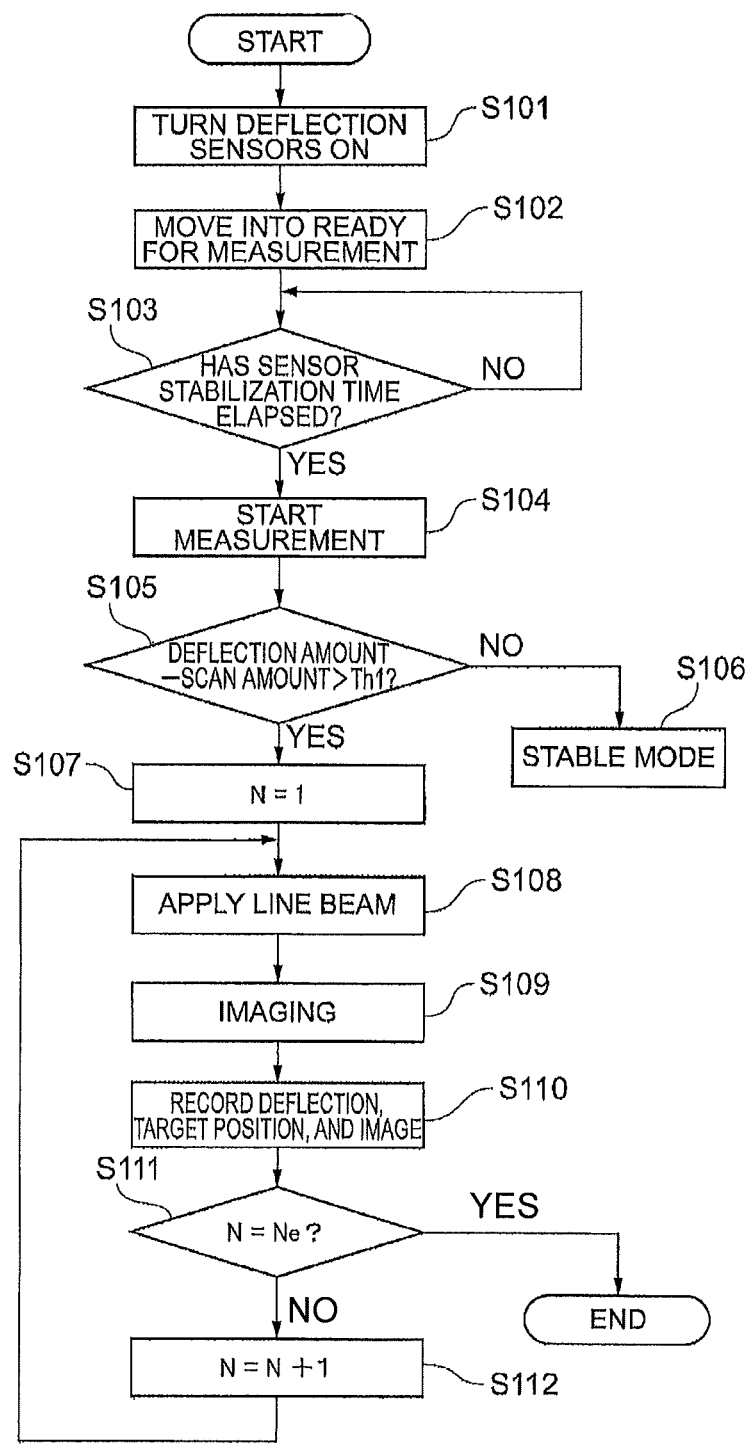
FIG. 5 is an exemplary flowchart showing a procedure of measurement of a 3D profile using the profile measuring apparatus of the first embodiment.

The measurement of the 3D profile of the measured object 5 using the profile measuring apparatus 1 constructed as described above will be described blow with reference to the flowchart shown in FIG. 5. First, when the operator performs a predetermined measurement start operation (e.g., a push operation) on the measurement switch 29, the angular velocity sensor 28a and the acceleration sensor 28b of the deflection detecting unit 28 are actuated by operation control of the processing unit 32 in the controlling unit 30 (block S101). Next, for moving the probe 20 so as to go into the ready for measurement, the moving mechanism unit 15 moves the probe 20 to a predetermined measurement start position preliminarily set by teaching or the like (block S102). At this time, through operation control of the processing unit 32, the lock mechanisms 14 provided at the respective joints 13a-13f swing (or rotate) the arms or the probe 20 and secure (or lock) them at predetermined measurement start positions.

Then the processing unit 32 determines whether a predetermined sensor stabilization time has elapsed since the actuation of the angular velocity sensor 28a and acceleration sensor 28b (block S103) and, after the lapse of the sensor stabilization time, it starts the measurement with slide movement (scan) of the probe 20 by the linear motor 17 (block S104). The sensor stabilization time herein is a period of time necessary for stabilization of vibration of a gyroscope (not shown) forming the angular velocity sensor 28a or the acceleration sensor 28b.

With the start of measurement, the linear motor 17 implements X-directional slide movement (scan) of the probe 20 through operation control of the processing unit 32. At this time, the displacement information (scan amount) of the probe 20 according to the operation of the linear motor 17 is output from the encoder of the linear motor 17 to the position calculating unit 33 of the controlling unit 30. Furthermore, at this time, the angular velocity sensor 28a detects the angular velocity of the probe 20 (illuminating unit 21 and imaging unit 25) and the acceleration sensor 28b detects the acceleration of the probe 20; the deflection detecting unit 28 calculates the deflection of the probe 20 as described above, based on the angular velocity and the acceleration detected by the angular velocity sensor 28a and the acceleration sensor 28b, respectively, and outputs the deflection to the processing unit 32. It is noted that a high-pass filter (not shown) may be used in order to cut noise due to long-period detection signal deviation (so called drift) of the angular velocity sensor 28a and acceleration sensor 28b, when the deflection detecting unit 28 detects the deflection of the probe 20.

After the deflection detecting unit 28 detects the deflection of the probe 20, the processing unit 32 determines whether the X-directional deflection amount of the probe 20 (amount resulting from subtraction of the scan amount of the probe 20 from the X-directional deflection amount obtained using the angular velocity and acceleration, as described above) is larger than a predetermined threshold Th1 (block S105). The predetermined threshold Th1 is a deflection amount of the probe 20 which starts to affect the calculation result of the profile information (3D profile) by the profile calculating unit 34. When the determination herein is No, the deflection of the probe 20 is small and thus the measuring apparatus moves into a stable mode (block S106) to carry out the normal measurement without execution of the correction according to the deflection of the probe 20. When the determination herein is Yes on the other hand, an imaging count N is set to N=1 (block S107).

When the imaging count N is set to N=1, the illuminating unit 21 performs irradiation with the line beam (block S108). At this time, the light source 22 is turned on through operation control of the processing unit 32, the light emitted from the light source 22 passes through the pattern forming unit 23 to become a line beam, and the line beam is applied (or projected) onto the measured object 5 on the stage 6 by the projection lens 24.

An image of the line beam (line image) projected onto the measured object 5 is formed on an imaging plane of the imaging device 27 by the imaging optical system 26. Then the imaging device 27 takes the line image (block S109). At this time, through operation control of the processing unit 32, the imaging device 27 performs photoelectric conversion of the line image formed on the imaging plane, to generate an image signal, and outputs the image information to the profile calculating unit 34. The profile calculating unit 34 has a measurement table (not shown) in which plural pieces of image information can be recorded in order to calculate the profile information of the measured object 5, and data recorded together with the image information of the line image in the measurement table includes the projected position information (target position) of the line beam from the probe 20 in the imaging operation calculated by the position calculating unit 33, and a change amount of the position of the probe 20 and a change amount of the projection direction of the line beam due to the deflection of the probe 20 in the imaging operation detected by the deflection detecting unit 28 (block S110).

When a total imaging count is represented by Ne, the processing unit 32 determines whether N=Ne (block S111). When the determination herein is No, the count N is set to N=N+1 (block S112) and the processing returns to block S108. Namely, the blocks S108 to S110 are repeated until all imaging operations are completed. When the determination herein is Yes on the other hand, the profile calculating unit 34 calculates the profile information (3D profile) of the measured object 5 using the projected position information of line beam that can be obtained from the image information of the line image and the position information of the probe 20 recorded in the measurement table (not shown) and then the processing is terminated. As described above, when the profile calculating unit 34 calculates the profile information of the measured object 5, the control is performed in such a manner that the correction operation (passive correction) for the measurement position on the measured object 5 is carried out so as to cancel the influence due to the unintended deflection of the probe 20, based on the deflection of the probe 20 (illuminating unit 21 and imaging unit 25) detected by the deflection detecting unit 28.

As described above, the first embodiment can reduce the measurement error of the 3D profile, even with vibration added to the profile measuring apparatus 1. In the first embodiment, the measurement error of the 3D profile can be reduced more by correcting the positional deviation of the projected position of line beam due to the deflection of the probe 20.

Figure 6:
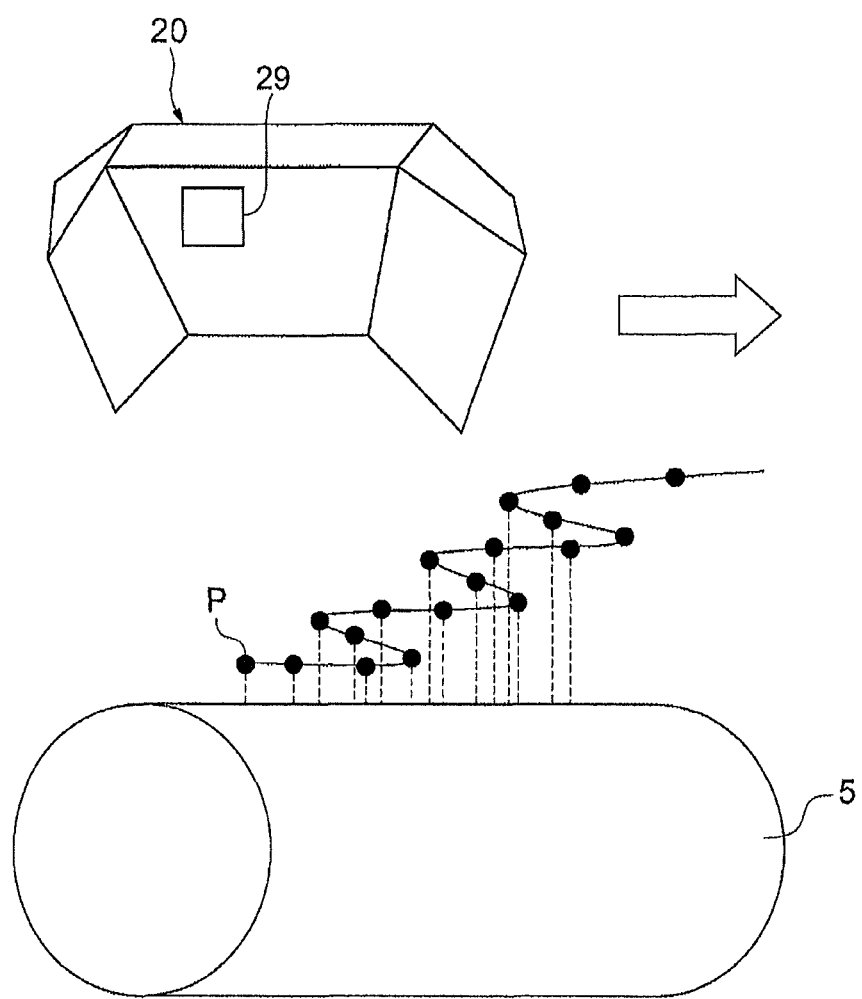
FIG. 6 is an exemplary drawing showing a modification example in the profile measuring apparatus of the first embodiment.

In the above-described first embodiment, if the X-directional deflection of the probe 20 occurs because of the influence of vibration from the outside, the probe 20 scans the measured object 5 while vibrating in the X-direction as shown in FIG. 6, and the density of imaging positions P becomes higher or lower than in the case without deflection of the probe 20, every measurement region. Then the apparatus may be configured so as to exclude from measurement targets, the image information at a region where the density at a measurement point became higher, among the plurality of imaging positions P. This allows the profile calculating unit 34 to calculate the profile information using the image information with less deflection of the probe 20, whereby the measurement error of the 3D profile can be decreased more.

The foregoing first embodiment showed the example of the passive correction to perform such calculation as to cancel the influence of the unintended deflection amount in the X-direction (or Y-direction) of the probe 20, for the X-directional (or Y-directional) coordinate value of the line image on the picture, but the correction does not always have to be limited only to this example. For example, it is also possible to adopt such a configuration that the deflection detecting unit 28 detects the Z-directional deflection of the probe 20 and the correction is carried out so as to perform such calculation as to cancel a Z-directional deflection amount of the probe 20, for the Z-directional coordinate value of the line image on the picture. This can more reduce the measurement error of the 3D profile caused by influence of the positional deviation of the line image projected onto the measured object, due to the deflection in the Z-direction (height direction of the measured object 5) of the probe 20.

Figure 16:
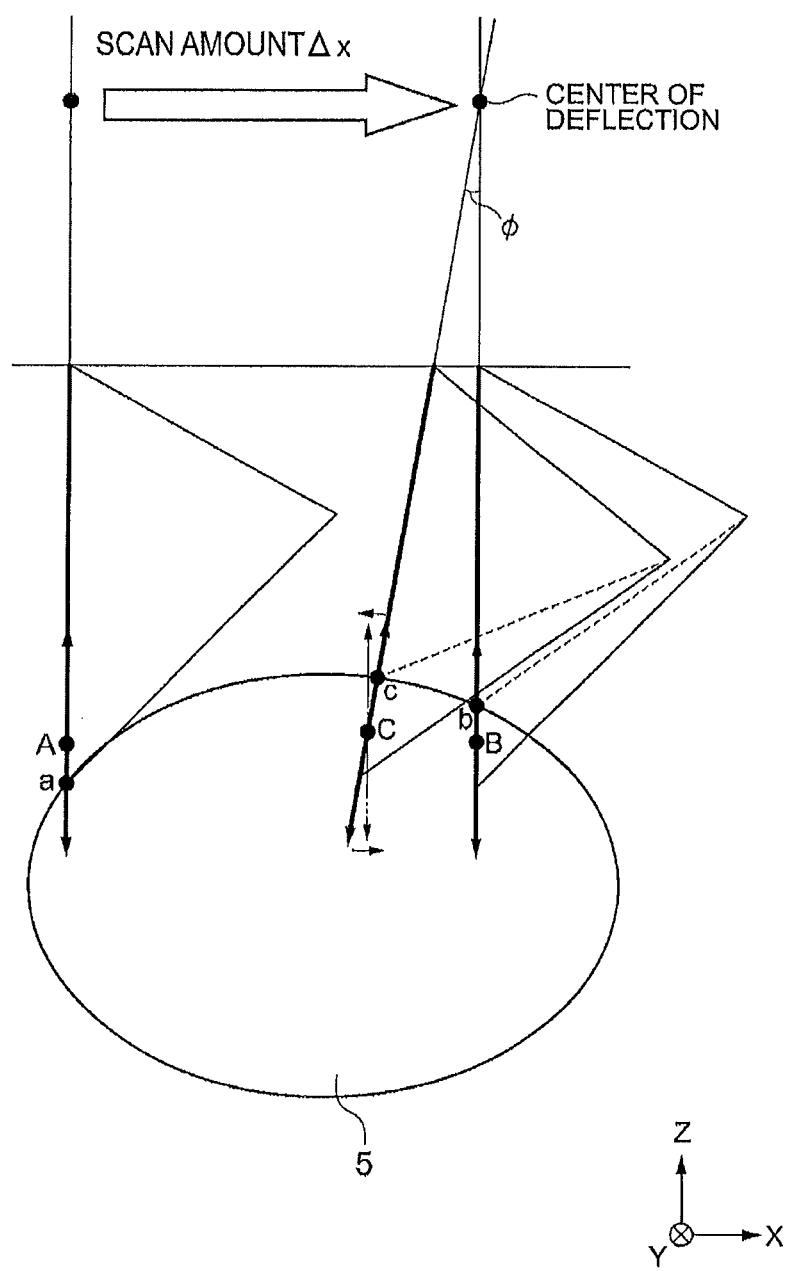
FIG. 16 is an exemplary schematic view showing an example of illumination correction in the modification example of the illuminating unit.
Figure 17:
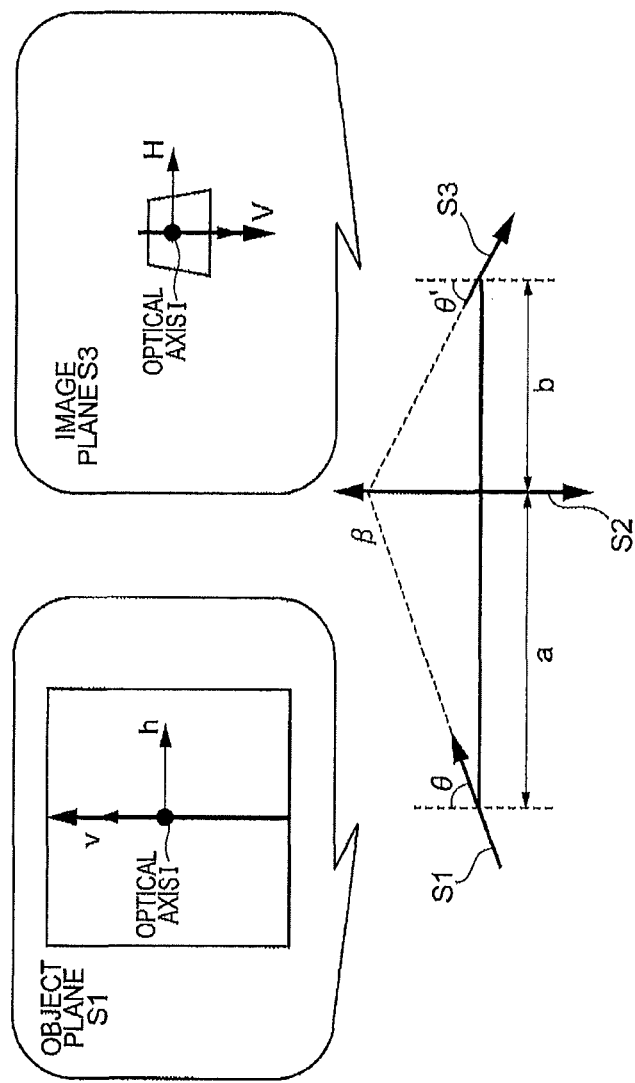
FIG. 17 is an exemplary drawing showing an example of an optical system satisfying the Scheimpflug principle.

An example of the correction operation (passive correction) for the measurement position on the measured object 5 in the first embodiment will be described below with reference to FIGS. 16 and 17. First, let us explain a relation between coordinates on the imaging device 27 (image plane) and coordinates on the object (object plane). As shown in FIG. 17, let (H,V) be coordinates on the image plane S3 with an origin on the optical axis I and (h,v) be coordinates on the object plane S1 with an origin on the optical axis I. As described previously, the image plane of the imaging optical system 26 satisfies the Scheimpflug principle. For this reason, as shown in FIG. 17, the conditions represented by formula (1) and formula (2) below are satisfied where a is a distance from the position of the object plane S1 on the optical axis I to the principal plane S2, b is a distance from the principal plane S2 to the position of the image plane S3 on the optical axis I, b/a=β, θ is an inclination of the object plane S1 relative to a plane normal to the optical axis I, and θ' is an inclination of the image plane S3 relative to a plane normal to the optical axis I.

$$h = \frac{H \times b}{b\beta - (1 + \beta) \times V\sin\theta'} \quad (1)$$

$$v = \frac{V \times b \times \sqrt{\cos^2\theta' + \frac{\sin^2\theta'}{\beta^2}}}{b\beta - (1 + \beta) \times V\sin\theta'} \quad (2)$$

Next, a coordinate change on the measured object 5 due to deviation of projected position of the line beam will be described. As shown in FIG. 16, when A(x0,y0,z0) represents coordinates of an intersection between the optical axis of the illuminating unit 21 and the optical axis of the imaging unit 25 at a scan origin, and when (h0,v0) represents coordinates on the object plane satisfying the Scheimpflug principle (which is the YZ plane in the example of FIG. 16), coordinates of the line beam on the surface of the measured object 5 at this time are given by a(x0,y0+h0,z0+v0). After the probe 20 undergoes slide movement by a scan amount Δx in the X-direction, coordinates of the intersection between the optical axis of the illuminating unit 21 and the optical axis of the imaging unit 25 are given by B(x0+Δx,y0,z0). Furthermore, where coordinates on the object plane are (h1,v1), coordinates of the line beam on the surface of the measured object 5 at this time are given by b(x0+Δx,y0+h1,z0+v1). Supposing that the deflection due to rotation of the probe 20 is induced by the angle of rotation $\phi$ with the radius of gyration r upon the slide movement of the probe 20 by the scan amount $\Delta x$ in the X-direction, coordinates of the intersection between the optical axis of the illuminating unit 21 and the optical axis of the imaging unit 25 are given by C(x0+$\Delta$x−r×sin $\phi$,y0,z0+r×(1−cos $\phi$)). Furthermore, when coordinates on the object plane are (h2, v2), coordinates of the line beam on the surface of the measured object 5 at this time are given by c(x0×$\Delta$x−r×sin $\phi$,y0+h2,z0+r×(1−cos $\phi$)+v2×cos $\phi$).

The below will describe the correction for the position information of the image obtained from the line image, i.e., the correction for coordinates of the line beam applied onto the surface of the measured object 5. When coordinates of the line image obtained on the imaging device 27 (image plane) are represented by (H,V), if the aforementioned deflection amount of the probe 20 is larger than the predetermined threshold Th1, the correction for the position information of the image obtained from the line image is carried out and the coordinates of the line beam on the surface of the measured object 5 after the correction can be obtained as (x0×$\Delta$x−r×sin $\phi$,y0+h,z0+r×(1−cos $\phi$)+v×cos $\phi$), using the aforementioned coordinates c. On the other hand, when the aforementioned deflection amount of the probe 20 is not more than the predetermined threshold Th1, the correction for the image position information of the line image is not carried out and the coordinates of the line beam on the surface of the measured object 5 can be obtained as (x0+Lx,y0+h,z0+v), using the aforementioned coordinates b.

The coordinates (h,v) on the object plane can be determined using the aforementioned formulae (1) and (2) from the coordinates (H,V) of the line image. The parameters b, $\beta$, and $\theta'$ in the formulae (1) and (2) herein are values determined by the optical system and are known. Furthermore, the radius of gyration r and the angle of rotation $\phi$ can be obtained by the deflection detecting unit 28 as described above. The scan amount $\Delta x$ can be obtained from the output of the encoder of the linear motor 17.

Second Embodiment

Next, the second embodiment of the profile measuring apparatus will be described. The profile measuring apparatus of the second embodiment has the same configuration as the profile measuring apparatus 1 of the first embodiment, except for a part of the processing in the controlling unit 30, and therefore the detailed description thereof will be omitted by denoting each unit by the same reference sign as in the case of the first embodiment. Namely, the controlling unit 30 in the second embodiment executes active correction for the operation control of the illuminating unit 21 or the imaging unit 25 (profile measuring unit 10), based on deflection of the front part 21 (projecting unit) detected by the deflection detecting unit 28.

Figure 7:
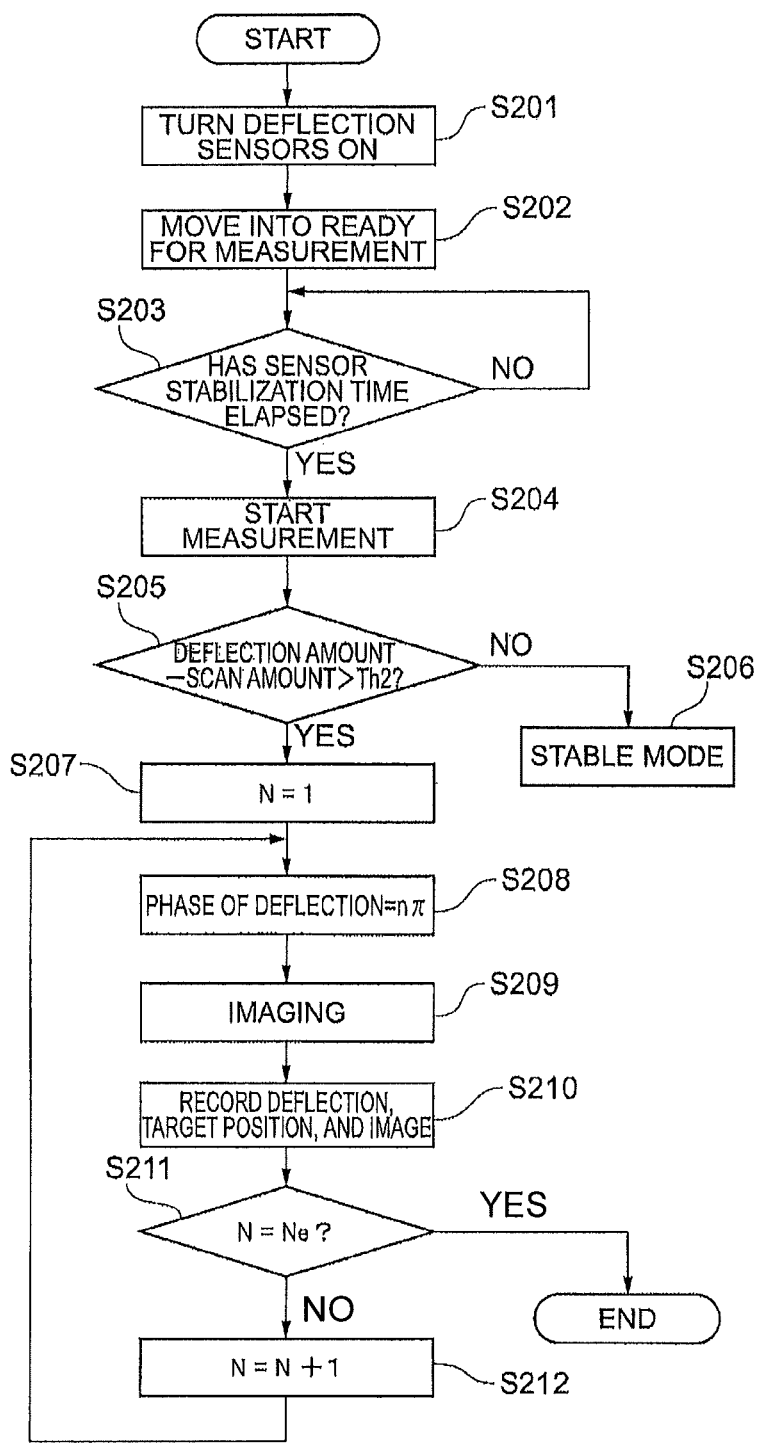
FIG. 7 is an exemplary flowchart showing a procedure of measurement of a 3D profile using the profile measuring apparatus of the second embodiment.

The measurement of the 3D profile of the measured object 5 using the profile measuring apparatus of the second embodiment will be described below with reference to the flowchart shown in FIG. 7. First, when the operator performs the predetermined measurement start operation (e.g., the push operation) on the measurement switch 29, the angular velocity sensor 28a and the acceleration sensor 28b of the deflection detecting unit 28 are actuated through the operation control of the processing unit 32 in the controlling unit 30 (block S201). Next, for going into the ready for measurement, the moving mechanism unit 15 moves the probe 20 to the predetermined measurement start position preliminarily set by teaching or the like, as in the case of the first embodiment (block S202).

Here the processing unit 32 determines whether the predetermined sensor stabilization time has elapsed since the actuation of the angular velocity sensor 28a and acceleration sensor 28b (block S203) and, in the same manner as in the case of the first embodiment, the slide movement (scan) of the probe 20 is carried out by the linear motor 17 after the lapse of the sensor stabilization time and then the measurement is started (block S204).

With the start of measurement, as in the case of the first embodiment, the processing unit 32 determines whether the X-directional deflection amount of the probe 20 (amount obtained by subtraction of the scan amount of the probe 20 from the X-directional deflection amount obtained using the angular velocity and acceleration, as described previously) is larger than a predetermined threshold Th2 (block S205). The predetermined threshold Th2 is a deflection amount of the probe 20 which starts to affect the calculation result of the profile information (3D profile) by the profile calculating unit 34. When the determination herein is No, the apparatus moves into the stable mode because of the small deflection of the probe 20 (block S206) to perform the normal measurement without execution of the correction according to the deflection of the probe 20. When the determination herein is Yes on the other hand, the imaging count N is set to N=1 (block S207).

When the imaging count N is set to N=1, the processing unit 32 determines the period of the deflection (e.g., in the X-direction) of the probe 20 and controls the imaging device 27 to take the line image at the phase of the deflection of the probe 20 becoming N×$\pi$ (block S208). At this time, the light source 22 is turned on through the operation control of the processing unit 32, the light emitted from the light source 22 passes through the pattern forming unit 23 to become the line beam, and the line beam is applied (or projected) onto the measured object 5 on the stage 6 by the projection lens 24.

Since the image of the line beam (line image) applied onto the measured object 5 is formed on the imaging plane of the imaging device 27 by the imaging optical system 26, the imaging device 27 takes the line image on the imaging plane at the phase of the deflection of the probe 20 becoming n×$\pi$, through the operation control of the processing unit 32 (block S209). At this time, as in the case of the first embodiment, the image information of the line image output from the imaging device 27 is recorded, together with the position information (target position) of the probe 20 in the imaging operation calculated by the position calculating unit 33, and the change amount of the position of the probe 20 and the change amount of the projection direction of the line beam due to the deflection of the probe 20 in the imaging operation detected by the deflection detecting unit 28, in the measurement table (not shown) of the profile calculating unit 34 (block S210).

When the total imaging count is represented by Ne, the processing unit 32 determines whether N=Ne (block S211). When the determination herein is Yes, the count N is set to N=N+1 (block S212) and the processing returns to block S208. Namely, the blocks S208 to S210 are repeated until all the imaging operations are completed. When the determination herein is No on the other hand, the profile calculating unit 34 calculates the profile information (3D profile) of the measured object 5, using the image information of the line image and the position information recorded in the measurement table (not shown), and then the processing is terminated. Since in the present embodiment the control is carried out in such a manner that the imaging device 27 takes the line image at the phase of the deflection of the probe 20 becoming N×$\pi$, supposing that the deflection of the probe 20 at the initial phase is zero, the imaging device 27 will take the line image at the phase timing when the deflection of the probe 20 is zero. For this reason, when the profile calculating unit 34 calculates the profile information of the measured object 5, there is no need for carrying out the correction for the image information (image position information) of the line image. The timing when the phase is N×π is, such timing that the magnitude of the deflection is small, and it may be determined in a range including N×π.

As described above, the second embodiment can achieve the same effect as the first embodiment. In the second embodiment, the control is carried out in such a manner that the imaging device 27 takes the line image at the phase timing when the deflection of the probe 20 is zero or when the motion of the line image formed on the imaging device 27 is a movement amount of not more than the pixel pitch of the imaging device 27 or not more than a half of the pixel pitch or not more than one third of the pixel pitch or not more than a quarter of the pixel pitch in a duration of acquisition of one frame, whereby the measurement error of the 3D profile can be reduced more.

In the above-described second embodiment, the processing unit 32 performs such control that the imaging device 27 takes the line image at the phase of the deflection of the probe 20 becoming N×π, but the control does not always have to be limited only to this example; in block S208, the control may be carried out in such a manner that the imaging device 27 takes the line image at the phase of the deflection of the probe 20 becoming (N−½)×π. In this case, supposing that the deflection of the probe 20 at the initial phase is zero, the imaging device 27 will take the line image at the phase timing when the deflection (absolute value) of the probe 20 is maximum. For this reason, it is necessary to perform the correction for the image information (image position information) of the line image when the profile calculating unit 34 calculates the profile information of the measured object 5, but when the deflection (absolute value) of the probe 20 becomes maximum, the imaging can be carried out without velocity change due to the deflection of the probe 20, and the line image can be taken as a clearer image, whereby the measurement error of the 3D profile can be reduced more.

Third Embodiment

Next, the third embodiment of the profile measuring apparatus will be described. The profile measuring apparatus of the third embodiment has the same configuration as the profile measuring apparatus 1 of the first embodiment, except for the configuration of the attaching part and a part of the processing in the controlling unit 30, and the detailed description thereof will be omitted by denoting each part by the same reference sign as in the case of the first embodiment. In this third embodiment, the controlling unit executes active correction for the position control of the profile measuring unit 10 including the probe 20, based on the deflection of the projecting unit detected by the deflection detecting unit 28.

Figure 8:
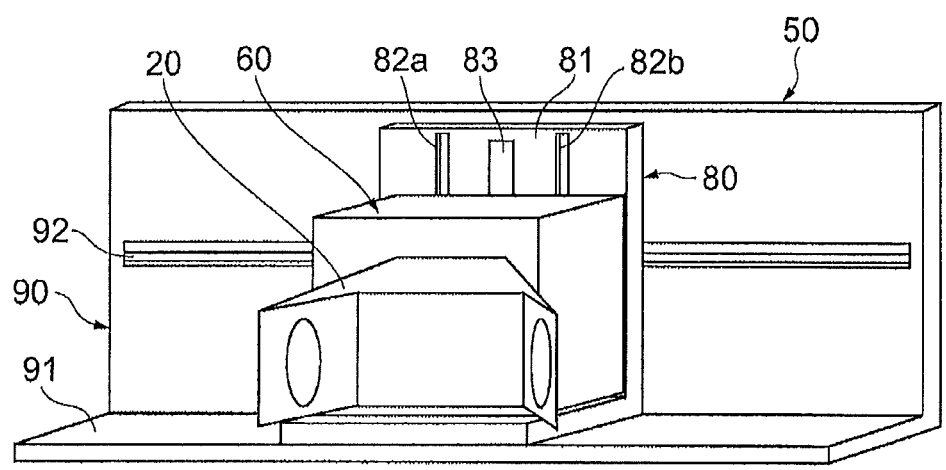
FIG. 8 is an exemplary enlarged view of an attaching part and a probe in the third embodiment.
Figure 8:
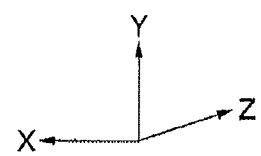

The attaching part 50 of the third embodiment functions as a part of a displacing mechanism for displacing the position of the probe 20, according to the output from the controlling unit 30, in a state in which it holds the probe 20 (illuminating unit 21 and imaging unit 25). This displacing mechanism is configured so as to hold the illuminating unit 21 and the imaging unit 25 while maintaining these illuminating unit 21 and imaging unit 25 at fixed relative positions, and includes a correction mechanism which performs the active correction for the profile measuring unit 10 including the probe 20, and a moving mechanism unit 15 which moves the correction mechanism relative to the measured object 5. The attaching part 50 is constructed, as shown in FIG. 8, with a rotation correcting mechanism 60 capable of correcting an orientation of the probe 20 by rotation while holding the probe 20 in a detachable state, a Y-parallel correcting mechanism 80 capable of correcting the Y-directional position of the probe 20 by translation, and an X-parallel correcting mechanism 90 capable of correcting the X-directional position of the probe 20 by translation, as the correction mechanism, and holds the probe 20 so as to be slidable (or able to scan) in the X-direction by an X-directional linear motor (not shown) of the X-parallel correcting mechanism 90.

The third embodiment will be described about a mode to drive the probe 20 so as to cancel the deflection of the probe 20, based on the deflection of the probe 20 (illuminating unit 21 and imaging unit 25) detected by the deflection detecting unit 28. Incidentally, if the radius of gyration of the deflection of the probe 20 is large and the deflection is small, the deflection can be approximated to deflection due to translation of the probe 20 and therefore the deflection of the probe 20 can be corrected by simply performing translation of the probe 20. However, as described previously, the deflection of the probe 20 includes the deflection due to the translation of the probe 20 and the deflection due to the rotation (the arc motion) of the probe 20. For this reason, when the deflection of the probe 20 is large, the deflection of the probe 20 cannot be corrected by simply performing the translation of the probe 20. Therefore, the attaching part 50 of the third embodiment is provided with the rotation correcting mechanism 60, in addition to the X-parallel correcting mechanism 90 and the Y-parallel correcting mechanism 80, as described above.

Figure 9:
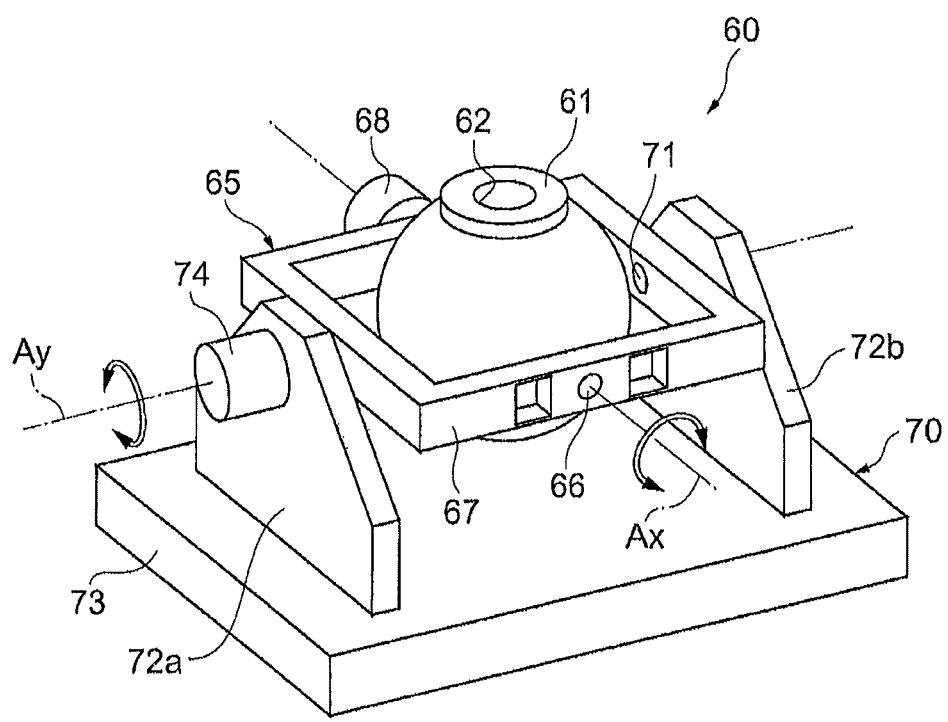
FIG. 9 is an exemplary enlarged view of a rotation correcting mechanism.

The rotation correcting mechanism 60 is constructed, as shown in FIG. 9, with a probe holding unit 61 which holds the probe 20 in a detachable state, an X-rotation supporting unit 65 which supports the probe holding unit 61 in a rotatable state around a rotation axis on an axis extending along the X-direction, and a Y-rotation supporting unit 70 which supports the X-rotation supporting unit 65 in a rotatable state around a rotation axis on an axis extending along the Y-direction. The probe holding unit 61 is formed in an approximately spherical shape with a flat part at a tip thereof. At the tip end of the probe holding unit 61, a holding hole 62 for holding the probe 20 is formed and, for example, an engagement projection (not shown) formed at the base end of the probe 20 is engaged with this holding hole 62, whereby the probe 20 is held as attached in a detachable state to the probe holding unit 61.

The X-rotation supporting unit 65 is constructed with a frame member 67 which supports the probe holding unit 61 in a rotatable state, and an X-rotation motor 68 which rotationally drives the probe holding unit 61. The frame member 67 supports the probe holding unit 61 located inside the frame member 67, in the rotatable state around a rotation axis on a center axis Ax of a rotation shaft 66, through the rotation shaft 66 extending in the X-direction. The X-rotation motor 68 is, for example, a servo motor incorporating an encoder, which rotationally drives the probe holding unit 61 around the rotation axis on the center axis Ax of the rotation shaft 66 and which detects an angle of rotation of the probe holding unit 61 upon this driving, i.e., an angle of rotation of the probe 20 around the rotation axis on the axis extending in the X-direction.

The Y-rotation supporting unit 70 is constructed with a pair of left and right brackets 72a, 72b which support the X-rotation supporting unit 65, together with the probe holding unit 61, in a rotatable state, a base plate 73 of a plate shape which supports the brackets 72a, 72b, and a Y-rotation motor 74 which rotationally drives the X-rotation supporting unit 65.

The pair of left and right brackets 72a, 72b support the X-rotation supporting unit 65 in the rotatable state around a rotation axis on a center axis Ay of a rotation shaft 71, through the rotation shaft 71 extending in the Y-direction. The base plate 73 is attached to the Y-parallel correcting mechanism 80 in a state in which it supports each of the brackets 72a, 72b. The Y-rotation motor 74 is, for example, a servo motor incorporating an encoder, which rotationally drives the X-rotation supporting unit 65 around the rotation axis on the center axis Ay of the rotation shaft 71 and which detects an angle of rotation of the X-rotation supporting unit 65 upon this driving, i.e., an angle of rotation of the probe 20 around the rotation axis on the axis extending in the Y-direction.

This configuration allows the rotation correcting mechanism 60 to hold the probe 20 in the rotatable state around the rotation axes on the axes extending in the X-, Y-directions and to correct the deflection due to the rotation of the probe 20. The operations of the X-rotation motor 68 and Y-rotation motor 74 are controlled by the controlling unit 30. Measurements by the encoders in the X-rotation motor 68 and the Y-rotation motor 74 are output from the respective motors (encoders) to the controlling unit 30.

The Y-parallel correcting mechanism 80 is constructed, as shown in FIG. 8, with a first holding plate 81, a pair of left and right Y-directional linear guides 82a, 82b attached to the first holding plate 81 and extending in the Y-direction, and a Y-directional linear motor 83 which drives the rotation correcting mechanism 60 in the Y-direction. The first holding plate 81 is formed in a plate shape bent at a nearly right angle and is arranged so that a bottom part thereof extends in the Y-direction and a side part thereof extends in the Z-direction. The pair of left and right Y-directional linear guides 82a, 82b are attached in parallel to each other to a wall of the first holding plate 81 and hold the rotation correcting mechanism 60 so as to be slidable (translatable) in the Y-direction. The Y-directional linear motor 83 is attached to the bottom part of the first holding plate 81 so as to extend in the Y-direction and drives the rotation correcting mechanism 60 in the Y-direction along the Y-directional linear guides 82a, 82b.

This configuration allows the Y-parallel correcting mechanism 80 to correct the deflection due to the Y-directional translation of the probe 20 held by the rotation correcting mechanism 60. The action of the Y-directional linear motor 83 is controlled by the controlling unit 30. An encoder (not shown) is incorporated in the Y-directional linear motor 83 and measurements by this encoder are output from the Y-directional linear motor 83 (encoder) to the controlling unit 30.

The X-parallel correcting mechanism 90 is constructed with a second holding plate 91, an X-directional linear guide 92 attached to the second holding plate 91 and extending in the X-direction, and an X-directional linear motor (not shown) which drives the Y-parallel correcting mechanism 80, together with the rotation correcting mechanism 60, in the X-direction. The second holding plate 91 is formed in a plate shape bent at a nearly right angle and is arranged so that a bottom part thereof extends in the Y-direction and a side part thereof extends in the Z-direction. The second holding plate 91 is arranged so as to overlap with the first holding plate 81, but the X-directional length of the second holding plate 91 is longer than that of the first holding plate 81 so as to permit slide movement (scan) in the X-direction of the Y-parallel correcting mechanism 80. The X-directional linear guide 92 is attached to the bottom part of the second holding plate 91 and holds the Y-parallel correcting mechanism 80 so as to be slidable (translatable) in the X-direction. The X-directional linear motor (not shown) is attached to the bottom part of the second holding plate 91 so as to extend in the X-direction, and drives the Y-parallel correcting mechanism 80 in the X-direction along the X-directional linear guide 92.

This configuration permits the X-parallel correcting mechanism 90 to slide (scan) the probe 20 held on the rotation correcting mechanism 60, in the X-direction and to correct the deflection due to the X-directional translation of the probe 20. The operation of the X-directional linear motor (not shown) is controlled by the controlling unit 30. An encoder (not shown) is incorporated in the X-directional linear motor and measurements by this encoder are output from the X-directional linear motor (encoder) to the controlling unit 30.

Figure 10:
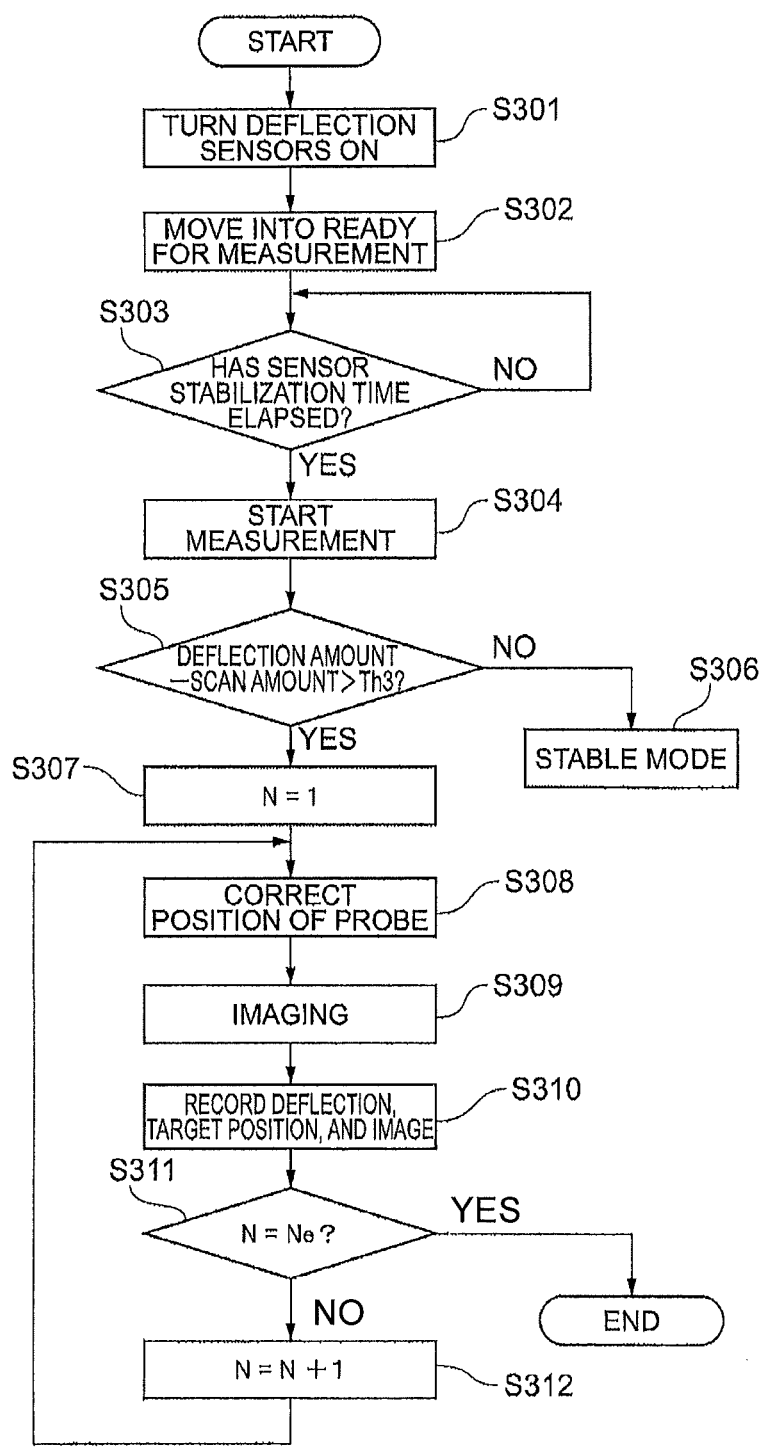
FIG. 10 is an exemplary flowchart showing a procedure of measurement of a 3D profile using the profile measuring apparatus of the third embodiment.

The measurement of the 3D profile of the measured object 5 using the profile measuring apparatus of the third embodiment will be described below with reference to the flowchart shown in FIG. 10. First, when the operator performs the predetermined measurement start operation (e.g., the push operation) on the measurement switch 29, the angular velocity sensor 28a and acceleration sensor 28b of the deflection detecting unit 28 are actuated through the operation control of the processing unit 32 in the controlling unit 30 (block S301). Next, for going into the ready for measurement, the moving mechanism unit 15 moves the probe 20 to the predetermined measurement start position preliminarily set by teaching or the like, as in the case of the first embodiment (block S302).

Then the processing unit 32 determines whether the predetermined sensor stabilization time has elapsed since the actuation of the angular velocity sensor 28a and acceleration sensor 28b (block S303) and, as in the case of the first embodiment, after the lapse of the sensor stabilization time, the probe 20 is subjected to slide movement (scan) by the X-directional linear motor (not shown) of the X-parallel correcting mechanism 90 to start measurement (block S304).

With the start of measurement, as in the case of the first embodiment, the processing unit 32 determines whether the X-directional deflection amount of the probe 20 (amount obtained by subtraction of the scan amount of the probe 20 from the X-directional deflection amount obtained using the angular velocity and acceleration, as described previously) is larger than a predetermined threshold Th3 (block S305). The predetermined threshold Th3 is a deflection amount of the probe 20 which starts to affect the calculation result of the profile information (3D profile) by the profile calculating unit 34. When the determination herein is No, the apparatus moves into the stable mode because of the small deflection of the probe 20 (block S306) to perform the normal measurement without execution of the correction according to the deflection of the probe 20. When the determination herein is Yes on the other hand, the imaging count N is set to N=1 (block S307).

When the imaging count N is set to N=1, the processing unit 32 starts the illumination by the illuminating unit 21 and performs the control to drive the probe 20 so as to cancel the deflection of the probe 20, based on the deflection of the probe 20 (illuminating unit 21 and imaging unit 25) detected by the deflection detecting unit 28 (block S308). At this time, through the operation control of the processing unit 32, the rotation correcting mechanism 60, Y-parallel correcting mechanism 80, and X-parallel correcting mechanism 90 rotate or translate the probe 20 so as to cancel the deflection of the probe 20, based on the deflection of the probe 20 detected by the deflection detecting unit 28, thereby to correct the irradiation position of the line beam by the illuminating unit 21 and correct the imaging position by the imaging unit 25 so as to keep the relative position thereof to the illuminating unit 21.

As described previously, the rotation correcting mechanism 60 corrects the deflection due to the rotation of the probe 20 and the Y-parallel correcting mechanism 80 corrects the deflection due to the Y-directional translation of the probe 20. Furthermore, with X-directional slide movement (scan) of the probe 20, the X-parallel correcting mechanism 90 corrects the deflection due to the X-directional translation of the probe 20. In a state in which the irradiation position of the line beam by the illuminating unit 21 is corrected in this manner, the light source 22 is turned on through the operation control of the processing unit 32, the light emitted from the light source 22 passes through the pattern forming unit 23 to become the line beam, and the line beam is applied (or projected) onto the measured object 5 on the stage 6 by the projection lens 24.

Since the image of the line beam (the line image) applied onto the measured object 5 is formed on the imaging plane of the imaging device 27 by the imaging optical system 26, the imaging device 27 takes the line image on the imaging plane through the operation control of the processing unit 32 (block S309). At this time, in the same manner as in the case of the first embodiment, the image information of the line image output from the imaging device 27 is recorded, together with the position information (target position) of the probe 20 in the imaging operation calculated by the position calculating unit 33, and the deflection of the probe 20 in the imaging operation detected by the deflection detecting unit 28, in the measurement table (not shown) of the profile calculating unit 34 (block S310).

When the total imaging count is represented by Ne, the processing unit 32 determines whether N=Ne (block 311). When the determination herein is No, the count N is set to N=N+1 (block S312) and the processing returns to block S308. Namely, the blocks S308 to S310 are repeated until all the imaging operations are completed. When the determination herein is Yes on the other hand, the profile calculating unit 34 calculates the profile information (3D profile) of the measured object 5, using the image information of the line image and the position information recorded in the measurement table (not shown), and the processing is terminated. Since in the present embodiment the irradiation position of the line beam by the illuminating unit 21 is corrected by such rotation or translation of the probe 20 as to cancel the deflection of the probe 20, if the deflection of the probe 20 can be completely canceled by the correction, there is no need for performing the correction for the image information (image position information) of the line image as described in the first embodiment, when the profile calculating unit 34 calculates the profile information of the measured object 5.

In this manner, the third embodiment can also achieve the same effect as the first embodiment. In the third embodiment, the positional deviation of the line beam (illumination light) due to the deflection of the probe 20 is corrected by driving the probe 20 (illuminating unit 21 and imaging unit 25), whereby the measurement error of the 3D profile can be reduced more.

Fourth Embodiment

Next, the fourth embodiment of the profile measuring apparatus will be described. The profile measuring apparatus of the fourth embodiment has the same configuration as the profile measuring apparatus 1 of the first embodiment, except for the configuration of the attaching part and a part of the processing in the controlling unit 30, and the configuration of the attaching part is the same as that of the attaching part 50 in the third embodiment; therefore, the detailed description thereof will be omitted by denoting each part by the same reference sign as in the first embodiment (except for the attaching part) and the third embodiment.

In this fourth embodiment, in accordance with the determination result by a determining unit, the controlling unit 30 executes the active correction for the position control or the operation control of the profile measuring unit 10 (illuminating unit 21 or imaging unit 25) and/or the passive correction for the calculation operation of the profile calculating unit 34, based on the deflection of the illuminating unit 21 (projecting unit) detected by the deflection detecting unit 28. Namely, the fourth embodiment will be described about a combinational mode of the correction for the image information (image position information) of the line image by the profile calculating unit 34 described in the first embodiment, the correction to adjust the imaging timing of the imaging unit 25 described in the second embodiment, and the correction for the irradiation position of the line beam by drive of the probe 20 described in the third embodiment.

In the present embodiment, the correction for the image information (image position information) of the line image by the profile calculating unit 34 described in the first embodiment will be referred to as passive correction, which is executed mainly by a first correcting unit. The correction to adjust the imaging timing of the imaging unit 25 described in the second embodiment and the correction for the irradiation position of the line beam by drive of the probe 20 described in the third embodiment will be referred to as active correction, which is executed mainly by a second correcting unit. Furthermore, in this fourth embodiment, the control target in the passive correction or the active correction is determined by the processing unit 32 (determining unit) included in the controlling unit 30. The first correcting unit is composed of the profile calculating unit 34 and others contributing to the passive correction, and the second correcting unit is composed of the rotation correcting mechanism 60, Y-parallel correcting mechanism 80, X-parallel correcting mechanism 90, rotation drive unit 125, etc. contributing to the active correction.

Figure 11:
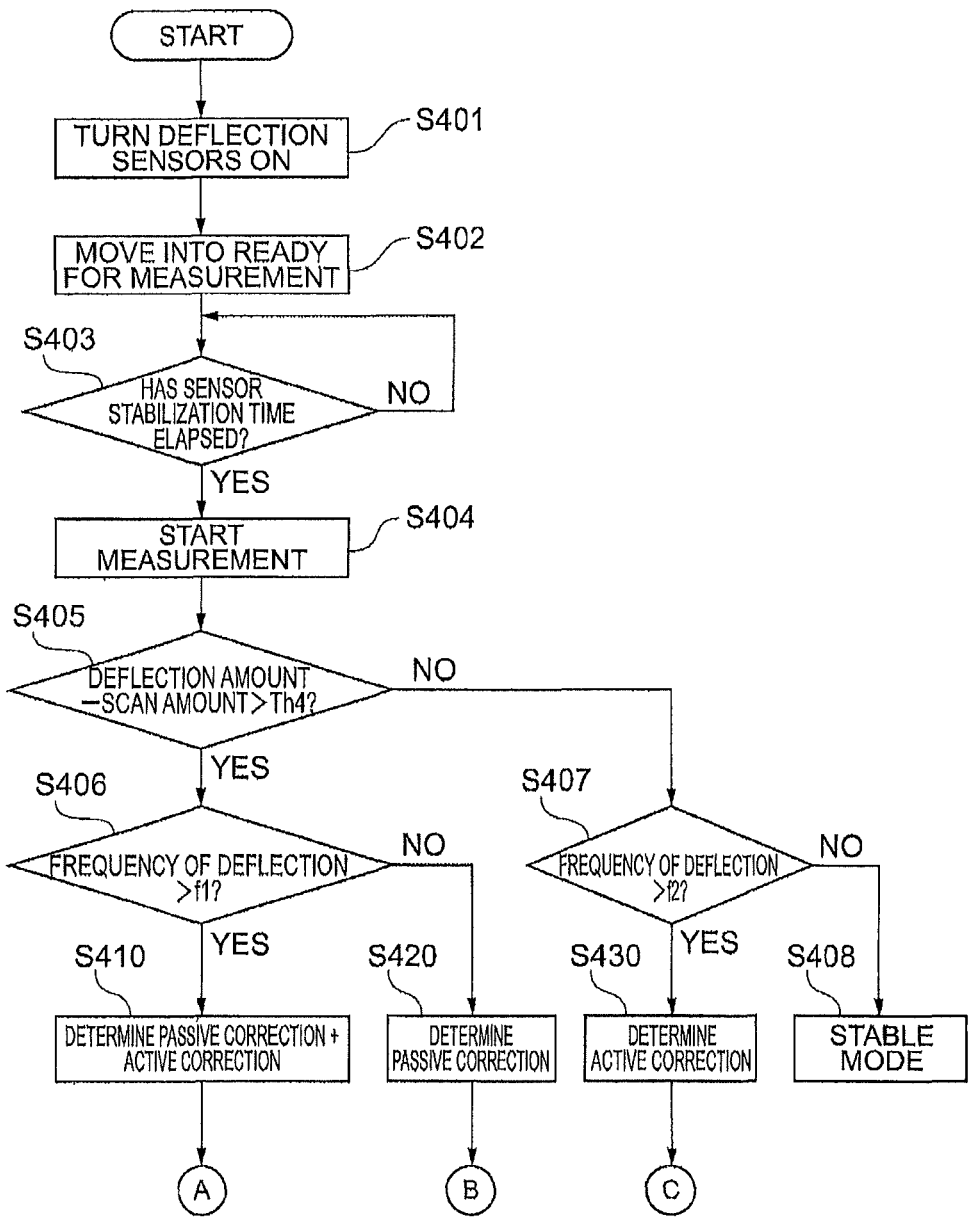
FIG. 11 is an exemplary first flowchart showing a procedure of measurement of a 3D profile using the profile measuring apparatus of the fourth embodiment.

The 3D profile measurement of the measured object 5 using the profile measuring apparatus of the fourth embodiment will be described below with reference to the flowcharts shown in FIGS. 11 to 14. First, as shown in FIG. 11, when the operator performs the predetermined measurement start operation (e.g., the push operation) on the measurement switch 29, the angular velocity sensor 28a and acceleration sensor 28b of the deflection detecting unit 28 are actuated through the operation control of the processing unit 32 in the controlling unit 30 (block S401). Next, for going into the ready for measurement, the moving mechanism unit 15 moves the probe 20 to the predetermined measurement start position preliminarily set by teaching or the like, as in the case of the first embodiment (block S402).

Then the processing unit 32 determines whether the predetermined sensor stabilization time has elapsed since the actuation of the angular velocity sensor 28a and acceleration sensor 28b (block S403) and, as in the case of the first embodiment, the slide movement (scan) of the probe 20 is effected by the X-directional linear motor (not shown) of the X-parallel correcting mechanism 90 after the lapse of the sensor stabilization time, to start the measurement (block S404).

With the start of measurement, as in the case of the first embodiment, the processing unit 32 determines whether the X-directional deflection amount of the probe 20 (the amount obtained by subtraction of the scan amount of the probe 20 from the X-directional deflection amount determined using the angular velocity and acceleration, as described previously) is larger than a predetermined threshold Th4 (block S405). When the determination herein is Yes, the processing unit 32 further determines whether the frequency of the deflection of the probe 20 (the inverse of the period of the deflection of the probe 20) is larger than a predetermined first frequency f1 (block S406).

When the determination in this block S406 is Yes, i.e., when the deflection amount of the probe 20 is larger than the predetermined threshold Th4 and when the frequency of the deflection of the probe 20 is larger than the predetermined first frequency f1, the processing unit 32 determines to perform both of the passive correction and the active correction in the subsequent measurement (block S410). When the determination in this block S406 is No on the other hand, i.e., when the deflection amount of the probe 20 is larger than the predetermined threshold Th4 and when the frequency of the deflection of the probe 20 is smaller than the predetermined first frequency f1, the processing unit (determining unit) 32 determines to perform only the passive correction in the subsequent measurement (block S420).

When the determination in the previous block S405 is No, the processing unit 32 similarly determines whether the frequency of the deflection of the probe 20 (the inverse of the period of the deflection of the probe 20) is larger than a predetermined second frequency f2 (block S407). When the determination in this block S407 is Yes, i.e., when the deflection amount of the probe 20 is smaller than the predetermined threshold Th4 and when the frequency of the deflection of the probe 20 is larger than the predetermined second frequency f2, the processing unit (determining unit) 32 determines to perform only the active correction in the subsequent measurement (block S430). When the determination in this block S407 is No on the other hand, i.e., when the deflection amount of the probe 20 is smaller than the predetermined threshold Th4 and when the frequency of the deflection of the probe 20 is smaller than the predetermined second frequency f2, the apparatus moves into the stable mode (block S408) to perform the normal measurement without execution of the correction according to the deflection of the probe 20.

The predetermined threshold Th4 is a deflection amount of the probe 20 which starts to affect the calculation result of the profile information (3D profile) by the profile calculating unit 34. The first frequency f1 is set, for example, to a value larger than the imaging frequency (sampling frequency) by the imaging unit 25, whereby the deflection of the probe 20 at high frequencies that is not fully corrected by the passive correction, can be corrected by the active correction. On the other hand, since the drive amount of the probe 20 by the active correction is limited, the deflection of the probe 20 with large deflection amounts that is not fully corrected by the active correction, can be corrected by the passive correction. The predetermined second frequency f2 may be set to the same value as the first frequency f1 or may be set to a value different from the first frequency f1 as occasion may demand.

Figure 12:
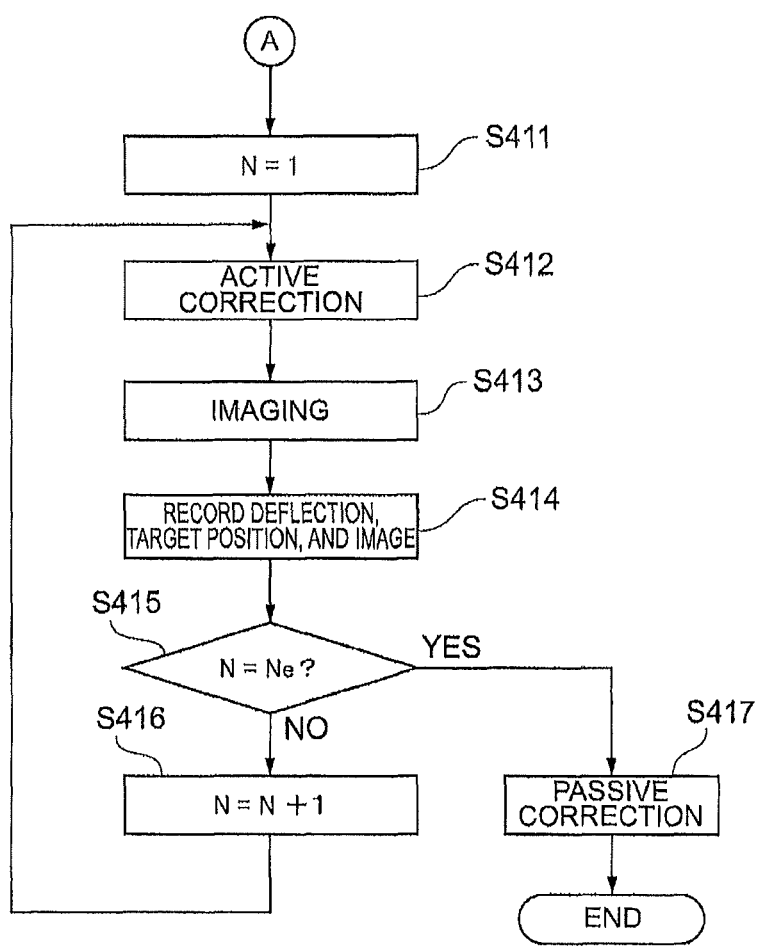
FIG. 12 is an exemplary second flowchart showing a procedure of measurement of a 3D profile using the profile measuring apparatus of the fourth embodiment.

When both of the passive correction and the active correction are carried out, the imaging count N is set to N=1 as shown in FIG. 12 (block S411).

When the imaging count N is set to N=1, the processing unit 32 performs the control to implement the illumination by the illuminating unit 21 and to perform the active correction described in the third embodiment (block S412). At this time, through the operation control of the processing unit 32, the rotation correcting mechanism 60, Y-parallel correcting mechanism 80, and X-parallel correcting mechanism 90 rotate or translate the probe 20 so as to cancel the deflection of the probe 20, based on the deflection of the probe 20 detected by the deflection detecting unit 28, to correct the irradiation position of the line beam by the illuminating unit 21 and correct the imaging position by the imaging unit 25 so as to keep the relative position thereof to the illuminating unit 21.

In a state in which the irradiation position of the line beam by the illuminating unit 21 is corrected in this manner, the light source 22 is turned on through the operation control of the processing unit 32, the light emitted from the light source 22 passes through the pattern forming unit 23 to become the line beam, and the line beam is applied (or projected) onto the measured object 5 on the stage 6 by the projection lens 24.

Since the image of the line beam (line image) applied onto the measured object 5 is formed on the imaging plane of the imaging device 27 by the imaging optical system 26, the imaging device 27 takes the line image on the imaging plane through the operation control of the processing unit 32 (block S413). At this time, as in the case of the first embodiment, the image information of the line image output from the imaging device 27 is recorded, together with the position information (target position) of the probe 20 in the imaging operation calculated by the position calculating unit 33 and the deflection of the probe 20 in the imaging operation detected by the deflection detecting unit 28, in the measurement table (not shown) of the profile calculating unit 34 (block S414).

When the total imaging count is represented by Ne, the processing unit 32 determines whether N=Ne (block 415). When the determination herein is No, the count N is set to N=N+1 (block S416) and the processing returns to block S412. Namely, the blocks S412 to S414 are repeated until all the imaging operations are completed. When the determination herein is Yes on the other hand, the profile calculating unit 34 calculates the profile information (3D profile) of the measured object 5 with execution of the passive correction described in the first embodiment, using the image information of the line image and the position information recorded in the measurement table (not shown) (block S417), and then the processing is terminated.

Figure 13:
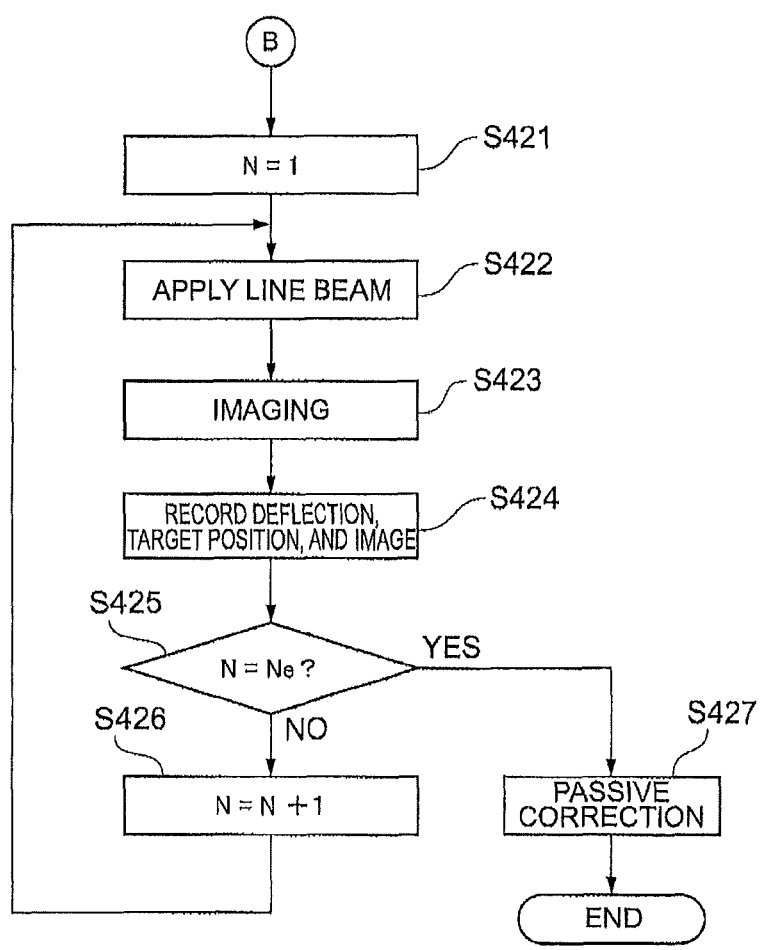
FIG. 13 is an exemplary third flowchart showing a procedure of measurement of a 3D profile using the profile measuring apparatus of the fourth embodiment.

When only the passive correction is carried out, the imaging count N is set to N=1 as shown in FIG. 13 (block S421)

When the imaging count N is set to N=1, the irradiation with the line beam is carried out by the illuminating unit 21, without execution of the active correction (block S422). At this time, the light source 22 is turned on through the operation control of the processing unit 32, the light emitted from the light source 22 passes through the pattern forming unit 23 to become the line beam, and the line beam is applied (or projected) onto the measured object 5 on the stage 6 by the projection lens 24.

Since the image of the line beam (line image) applied onto the measured object 5 is formed on the imaging plane of the imaging device 27 by the imaging optical system 26, the imaging device 27 takes the line image on the imaging plane through the operation control of the processing unit 32 (block S423). At this time, the image information of the line image output from the imaging device 27 is recorded, together with the position information (target position) of the probe 20 in the imaging operation calculated by the position calculating unit 33 and the deflection of the probe 20 in the imaging operation detected by the deflection detecting unit 28, in the measurement table (not shown) of the profile calculating unit 34 (block S424).

When the total imaging count is represented by Ne, the processing unit 32 determines whether N=Ne (block 425). When the determination herein is No, the count N is set to N=N+1 (block S426) and the processing returns to block S422. Namely, the blocks S422 to S424 are repeated until all the imaging operations are completed. When the determination herein is Yes on the other hand, the profile calculating unit 34 calculates the profile information (3D profile) of the measured object 5 with execution of the passive correction described in the first embodiment, using the image information of the line image and the position information recorded in the measurement table (not shown) (block S427), and then the processing is terminated.

Figure 14:
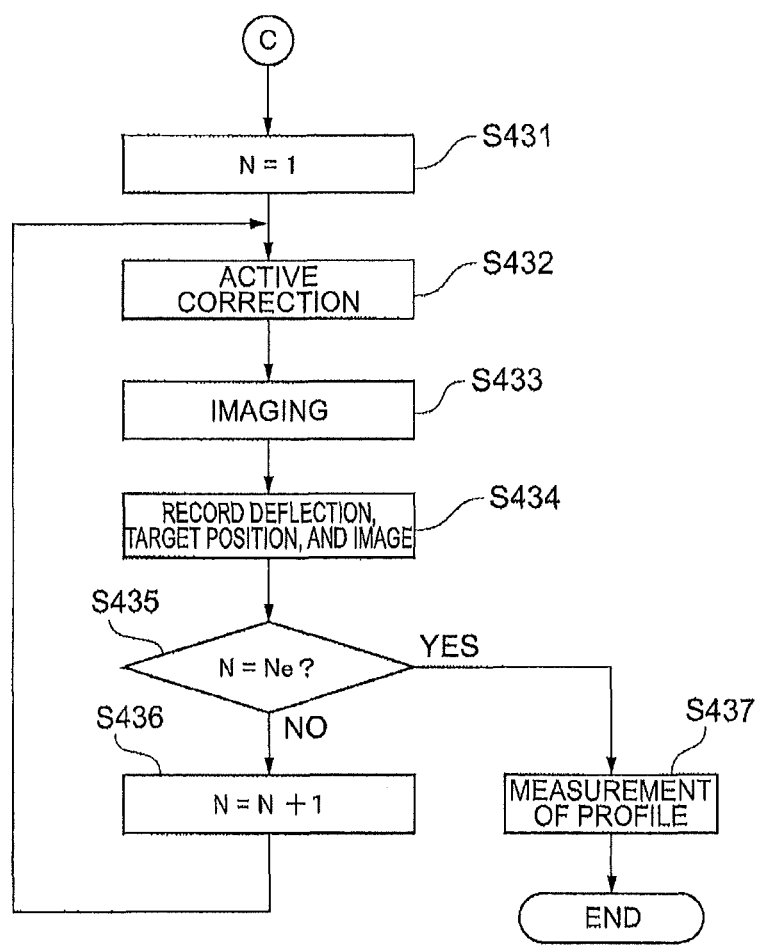
FIG. 14 is an exemplary fourth flowchart showing a procedure of measurement of a 3D profile using the profile measuring apparatus of the fourth embodiment.

When only the active correction is carried out, the imaging count N is set to N=1 as shown in FIG. 14 (block S431)

When the imaging count N is set to N=1, the processing unit 32 performs the control to implement the illumination by the illuminating unit 21 and to perform the active correction described in the third embodiment (block S432). At this time, in a state in which the irradiation position of the line beam by the illuminating unit 21 is corrected as described above, the light source 22 is turned on through the operation control of the processing unit 32, the light emitted from the light source 22 passes through the pattern forming unit 23 to become the line beam, and the line beam is applied (or projected) onto the measured object 5 on the stage 6 by the projection lens 24.

Since the image of the line beam (line image) applied onto the measured object 5 is formed on the imaging plane of the imaging device 27 by the imaging optical system 26, the imaging device 27 takes the line image on the imaging plane through the operation control of the processing unit 32 (block S433). At this time, the image information of the line image output from the imaging device 27 is recorded, together with the position information (target position) of the probe 20 in the imaging operation calculated by the position calculating unit 33 and the deflection of the probe 20 in the imaging operation detected by the deflection detecting unit 28, in the measurement table (not shown) of the profile calculating unit 34 (block S434).

When the total imaging count is represented by Ne, the processing unit 32 determines whether N=Ne (block S435). When the determination herein is No, the count N is set to N=N+1 (block S436) and the processing returns to block S432. Namely, the blocks S432 to S434 are repeated until all the imaging operations are completed. When the determination herein is Yes on the other hand, the profile calculating unit 34 calculates the profile information (3D profile) of the measured object 5 without execution of the passive correction, using the image information of the line image and the position information recorded in the measurement table (not shown) (block S437), and then the processing is terminated.

As described above, the fourth embodiment can achieve the same effect as the first embodiment. The fourth embodiment involves selective use of the passive correction and the active correction on an as-needed basis, whereby the measurement error of the 3D profile can be reduced more.

In each of the above-described embodiments, how to acquire the profile information of the measured object 5 by the probe 20 does not have to be limited only to the aforementioned method by triangulation based on light sectioning, but it is possible to arbitrarily employ a method of acquiring a bright field image and measuring the profile by computer analysis, a method by triangulation using a stereoscopic image, and so on.

In each of the above embodiments, the slide movement (scan) of the probe 20 (illuminating unit 21 and imaging unit 25) is implemented using the linear motor, but how to implement the slide movement does not always have to be limited only to this method; for example, the slide movement (scan) of the probe 20 may be implemented, for example, using a linear motion mechanism making use of a ball screw, a motor, and so on.

In each of the above embodiments, when it is determined whether the deflection amount of the probe 20 is larger than the predetermined threshold, the deflection amount of the probe 20 used is the amount obtained by subtraction of the scan amount of the probe 20 from the X-directional deflection amount detected by the deflection detecting unit 28; however, in the case where no angular velocity is detected by the angular velocity sensor 28a in preliminarily carrying out the scan operation in an environment without vibration, the X-directional deflection amount detected by the deflection detecting unit 28 (the raw deflection amount without subtraction of the scan amount of the probe 20) can be used as the deflection amount of the probe 20.

Figure 15:
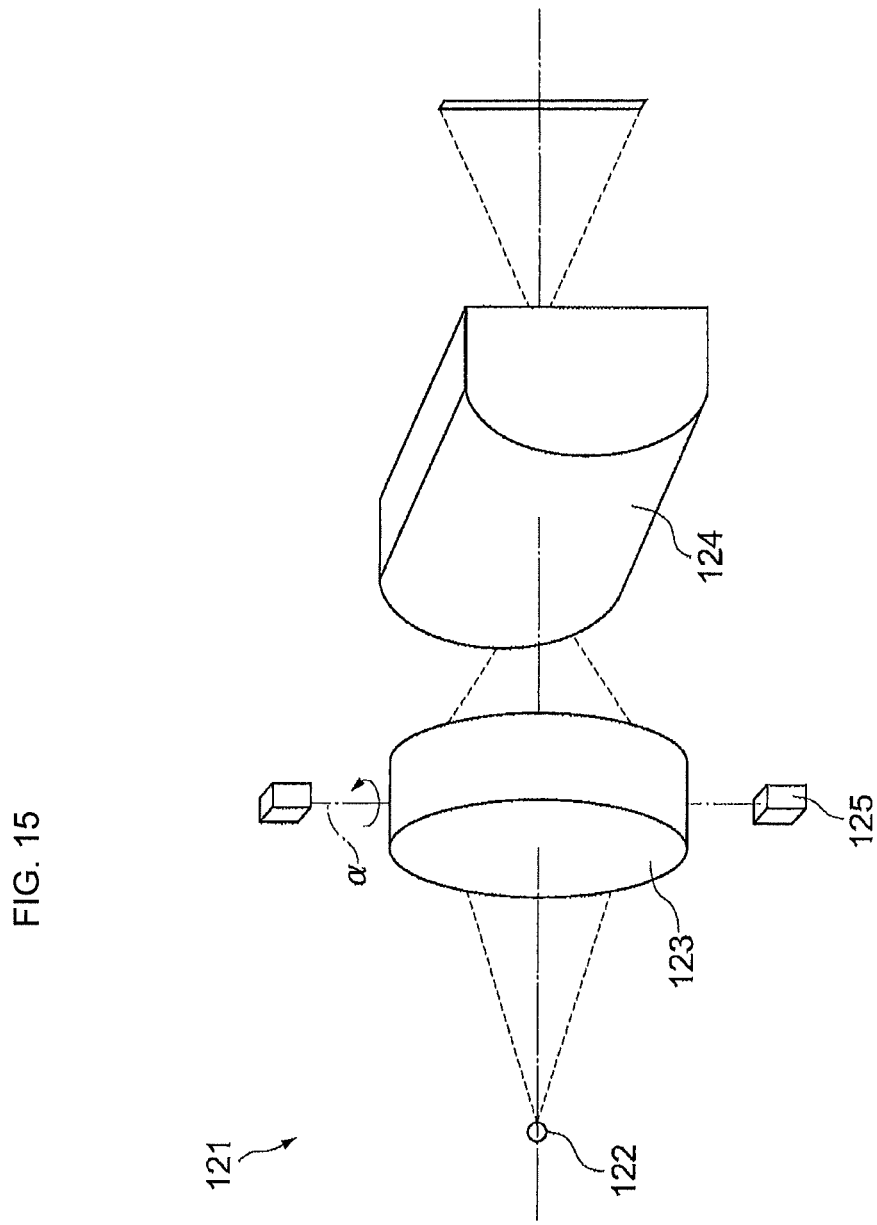
FIG. 15 is an exemplary schematic diagram showing a modification example of an illuminating unit in the third embodiment and the fourth embodiment.

In the above third embodiment and fourth embodiment, the apparatus is configured to drive the probe 20 so as to cancel the deflection of the probe 20, based on the deflection of the probe 20 (illuminating unit 21 and imaging unit 25) detected by the deflection detecting unit 28, but, without having to be limited to this, the apparatus may be configured to drive at least a part of the illuminating unit 21 or the imaging unit 25 forming the probe 20. For example, as shown in FIG. 15, the illuminating unit 121 of the probe may be constructed with a light source 122 such as an LED, a condenser lens 123, a cylindrical lens 124, and a rotation drive unit 125 which rotates the condenser lens 123 around a rotation axis α on an axis extending in a direction perpendicular to the optical-axis direction and the longitudinal direction of the cylindrical lens 124. The condenser lens 123 and the cylindrical lens 124 herein constitute a kind of pattern generating unit that modifies a light quantity distribution from the light source 122 into a light quantity distribution to obtain a line pattern on the surface of the measured object. The pattern generating unit does not always have to be limited only to this form, but may be an optical system having a stop to limit the beam from the light source to a rectangular shape and a projection lens to project an image of the stop onto the surface of the measured object. The configuration to drive the whole probe 20 is effective to the deflection with relatively low speed and large amplitude, and the configuration to drive a part of the optical system is effective to the deflection with relatively high speed and small amplitude. The configuration obtained by excluding the rotation drive unit 125 from this illuminating unit 121 is also applicable to the illuminating unit in the third embodiment and the fourth embodiment.

In the illuminating unit 121 of this configuration, the light emitted from the light source 122 travels through the condenser lens 123 and cylindrical lens 124 to become a sheet-like beam (sheet beam) and, when it is applied onto the measured object 5 on the stage 6, a line image appears on the measured object 5. In this case, for example, in the configuration shown in FIG. 16, when the condenser lens 123 is rotated around the rotation axis α by the rotation drive unit 125, the line image can be rotated around the rotation axis on the axis extending in the Y-direction, whereby positional deviation (mainly, rotational deviation) of the line image (illumination light) due to the deflection of the probe can be corrected.

In this case, an offset (positional deviation) can remain in the X-direction (scan direction), but the X-directional offset can be canceled out by inserting a plane-parallel plate (halving: not shown) between the cylindrical lens 124 and the measured object 5 and thereby translating the line image in the X-direction. When the line image is rotated or translated in this manner, the detection angle (relative angle to the illumination light) of the imaging unit 25 varies, and the system comes to fail in satisfying the Scheimpflug principle. In this case, it is necessary to also drive the optical system of the imaging unit so as to maintain the Scheimpflug principle in accordance with (or in synchronism with) the movement of the traveling plane of the line beam. It is desirable to also maintain the imaging magnification, as well as maintaining the Scheimpflug principle, but the imaging magnification can also be corrected by arithmetic processing. Furthermore, the profile information (3D profile) of the measured object 5 can be obtained in such a manner that when the profile calculating unit 34 calculates the profile information of the measured object 5, the image information (image position information) of the line image is corrected according to an angle of rotation of the condenser lens 123 by the rotation drive unit 125 or the like.

When the deflection of the probe 20 is corrected by driving a part of the illuminating unit 21 or the imaging unit 25, a correction drive range is limited in correction for the deflection with large amplitude, and therefore the correction drive may be started so as to perform an approach run, after preliminarily giving an offset in a direction reverse to the drive direction.

Furthermore, modification examples of the above embodiments also include examples described below. In the first embodiment, the correction is carried out so as to return the position of the line image to the original position by the image processing of the image at the position different from the position where it is to be originally taken, because of the deflection, but instead, the line image may be projected onto the original position by displacing an optical element constituting a part of the imaging optical system. The position of the line image can also be located at the original position by moving the imaging device so as to cancel out the movement in the moving direction of the image due to the deflection. A movement amount of the optical element or the imaging device at this time may be set based on the deflection amount detected by the deflection detecting unit.

It will be understood by those skilled in the art that aspects of embodiments of the subject matter disclosed above are intended to satisfy the requirement of disclosing at least one enabling embodiment of the subject matter of each claim and to be one or more such exemplary embodiments only and to not to limit the scope of any of the claims in any way and particularly not to a specific disclosed embodiment alone. Many changes and modification can be made to the disclosed aspects of embodiments of the disclosed subject matter of the claims that will be understood and appreciated by those skilled in the art, particularly in regard to interpretation of the claims for purposes of the doctrine of equivalents. The appended claims are intended in scope and meaning to cover not only the disclosed aspects of embodiments of the claimed subject matter but also such equivalents and other modifications and changes that would be apparent to those skilled in the art. In additions to changes and modifications to the disclosed and claimed aspects of the subject matter disclosed of the disclosed subject matter(s) noted above, others could be implemented.

While the particular aspects of embodiment(s) of the PROFILE MEASURING APPARATUS described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the subject matter claimed are merely exemplary, illustrative and representative of the subject matter which is broadly contemplated by the claimed subject matter. The scope of the presently described and claimed aspects of embodiments fully encompasses other embodiments which may now be or may become obvious to those skilled in the art based on the teachings of the Specification. The scope of the present PROFILE MEASURING APPARATUS is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the Specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act."

It will be understood also be those skilled in the art that, in fulfillment of the patent statutes of the United States, Applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, Applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "using," "taking," "keeping," "making," "determining," "measuring," "calculating" or the like), in defining an aspect/feature/element of, an action of or functionality of, and/or describing any other definition of an aspect/feature/element of an embodiment of the subject matter being disclosed. Wherever any such definitive word or phrase or the like is used to describe an aspect/feature/element of any of the one or more embodiments disclosed herein, i.e., any feature, element, system, sub-system, component, sub-component, process or algorithm step, particular material, or the like, it should be read, for purposes of interpreting the scope of the subject matter of what applicant(s) has invented, and claimed, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such features, elements, steps, materials and the like should be considered to be described only as a possible aspect of the one or more disclosed embodiments and not as the sole possible implementation of any one or more aspects/features/elements of any embodiments and/or the sole possible embodiment of the subject matter of what is claimed, even if, in fulfillment of the requirements of the patent statutes, Applicant(s) has disclosed only a single enabling example of any such aspect/feature/element of an embodiment or of any embodiment of the subject matter of what is claimed. Unless expressly and specifically so stated in the present application or the prosecution of this application, that Applicant(s) believes that a particular aspect/feature/element of any disclosed embodiment or any particular disclosed embodiment of the subject matter of what is claimed, amounts to the one an only way to implement the subject matter of what is claimed or any aspect/feature/element recited in any such claim, Applicant(s) does not intend that any description of any disclosed aspect/feature/element of any disclosed embodiment of the subject matter of what is claimed in the present patent application or the entire embodiment shall be interpreted to be such one and only way to implement the subject matter of what is claimed or any aspect/feature/element thereof, and to thus limit any claim which is broad enough to cover any such disclosed implementation along with other possible implementations of the subject matter of what is claimed, to such disclosed aspect/feature/element of such disclosed embodiment or such disclosed embodiment. Applicant(s) specifically, expressly and unequivocally intends that any claim that has depending from it a dependent claim with any further detail of any aspect/feature/element, step, or the like of the subject matter of what is claimed recited in the parent claim or claims from which it directly or indirectly depends, shall be interpreted to mean that the recitation in the parent claim(s) was broad enough to cover the further detail in the dependent claim along with other implementations and that the further detail was not the only way to implement the aspect/feature/element claimed in any such parent claim(s), and thus be limited to the further detail of any such aspect/feature/element recited in any such dependent claim to in any way limit the scope of the broader aspect/feature/element of any such parent claim, including by incorporating the further detail of the dependent claim into the parent claim.

The invention claimed is:

1. A profile measuring apparatus comprising:
a probe to project a predetermined pattern onto a part of a measured object, and to image the predetermined pattern projected by the probe to produce two-dimensional image information of the predetermined pattern;
a position acquiring unit which acquires a position of the probe;
a deflection detecting unit which detects a deflection of the probe and produces at least one deflection amount; and
a profile calculating unit which is connected so as to be able to communicate with the probe, the deflection detecting unit and the position acquiring unit,
wherein the profile calculating unit corrects the two-dimensional image information on the basis of the at least one deflection amount to produce corrected two-dimensional image information, and
wherein the profile calculating unit calculates a three-dimensional profile of the part of the measured object, based on the corrected two-dimensional image information and position information from the position acquiring unit, after the profile calculating unit corrects the two-dimensional image information.

2. The profile measuring apparatus according to claim 1, further comprising:
a base; and
a moving mechanism unit extending from the base and having a tip coupled to the probe.

3. A profile measuring apparatus comprising:
a probe to project a predetermined pattern onto a part of a measured object, and to image the predetermined pattern projected by the probe to produce two-dimensional image information of the predetermined pattern;
a position acquiring unit which acquires a position of the probe;
a deflection detecting unit which detects a deflection of the probe and produces at least one deflection amount; and
a profile calculating unit which is connected so as to be able to communicate with the probe, the deflection detecting unit and the position acquiring unit, and which calculates a three-dimensional profile of the measured object, based on image information from the probe, position information from the position acquiring unit, and the at least one deflection amount produced by the deflection detecting unit,
wherein the profile calculating unit:
corrects an image position of the predetermined pattern on an image plane obtained by the probe by correcting the two-dimensional image information on the basis of the at least one deflection amount produced by the deflection detecting unit to produce corrected two-dimensional image information;
calculates a position where the predetermined pattern is projected on the measured object from the position of the probe; and
calculates a three-dimensional profile of the part of the measured object based on the calculated position where the predetermined pattern is projected on the measured object and the corrected two-dimensional image information.

4. The profile measuring apparatus according to claim 3, wherein
the deflection detecting unit has at least one of an angular velocity detector to detect an angular velocity of the probe, and an acceleration detector to detect an acceleration of the probe, and
the deflection detecting unit detects the deflection, based on at least one of the angular velocity and the acceleration.

5. The profile measuring apparatus according to claim 4, wherein
the probe has an imaging optical system to form an image of the measured object, and
the imaging optical system is configured so that a plane conjugate with an imaging plane thereof includes an irradiation direction of the predetermined pattern projected from the probe.

6. The profile measuring apparatus according to claim 3, further comprising a controlling unit, which is connected to the deflection detecting unit, which executes comparison of the at least one deflection amount produced by the deflection detecting unit with a predetermined threshold and which controls the profile calculating unit to determine whether the correction in the profile calculating unit is performed or not, according to a result of the comparison.

7. The profile measuring apparatus according to claim 6, wherein correction control of the controlling unit is performed in accordance with the at least one deflection amount produced by the deflection detecting unit.

8. The profile measuring apparatus according to claim 7, wherein
the deflection detecting unit has at least one of an angular velocity detector to detect an angular velocity of the probe, and an acceleration detector to detect an acceleration of the probe, and
the deflection detecting unit detects the deflection, based on at least one of the angular velocity and the acceleration.

9. The profile measuring apparatus according to claim 8, wherein
the probe has an imaging optical system to form an image of the measured object, and the imaging optical system is configured so that a plane conjugate with an imaging plane thereof includes an irradiation direction of the predetermined pattern projected from the probe.

10. The profile measuring apparatus according to claim 7, wherein the deflection detecting unit detects the amount of the deflection in a scanning direction of the profile measuring unit.

11. The profile measuring apparatus according to claim 10, wherein
the deflection detecting unit has at least one of an angular velocity detector to detect an angular velocity of the probe, and an acceleration detector to detect an acceleration of the probe, and
the deflection detecting unit detects the deflection, based on at least one of the angular velocity and the acceleration.

12. The profile measuring apparatus according to claim 11, wherein
the probe has an imaging optical system to form an image of the measured object, and
the imaging optical system is configured so that a plane conjugate with an imaging plane thereof includes an irradiation direction of the predetermined pattern projected from the probe.

13. The profile measuring apparatus according to claim 6, further comprising a moving mechanism unit which moves the probe relative to the measured object,
wherein the controlling unit executes correction control, based on a difference between the at least one deflection amount produced by the deflection detecting unit and a movement amount the moving mechanism unit moves the probe relative to the measured object.

14. The profile measuring apparatus according to claim 13, wherein
the deflection detecting unit has at least one of an angular velocity detector to detect an angular velocity of the probe, and an acceleration detector to detect an acceleration of the probe, and
the deflection detecting unit detects the deflection, based on at least one of the angular velocity and the acceleration.

15. The profile measuring apparatus according to claim 14, wherein
the probe has an imaging optical system to form an image of the measured object, and
the imaging optical system is configured so that a plane conjugate with an imaging plane thereof includes an irradiation direction of the predetermined pattern projected from the probe.

* * * * *